United States Patent
Moriya et al.

(10) Patent No.: US 8,339,421 B2
(45) Date of Patent: Dec. 25, 2012

(54) IMAGE PROCESSING APPARATUS AND METHOD AND IMAGE DISPLAY APPARATUS AND METHOD

(75) Inventors: Shotaro Moriya, Tokyo (JP); Noritaka Okuda, Tokyo (JP); Satoshi Yamanaka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 618 days.

(21) Appl. No.: 12/526,231

(22) PCT Filed: Feb. 20, 2009

(86) PCT No.: PCT/JP2009/053015
§ 371 (c)(1),
(2), (4) Date: Aug. 6, 2009

(87) PCT Pub. No.: WO2009/110328
PCT Pub. Date: Sep. 11, 2009

(65) Prior Publication Data
US 2010/0134518 A1 Jun. 3, 2010

(30) Foreign Application Priority Data
Mar. 3, 2008 (JP) ................................. 2008-051837

(51) Int. Cl.
G09G 5/00 (2006.01)
(52) U.S. Cl. ........................................ 345/660; 345/671
(58) Field of Classification Search .......................... None
See application file for complete search history.

(56) References Cited

U.S. PATENT DOCUMENTS 6,295,322 B1 9/2001 Arbeiter et al.
6,307,569 B1 * 10/2001 Ratakonda ..................... 345/671
6,339,479 B1 1/2002 Kishimoto
6,816,166 B2 * 11/2004 Shimizu et al. ............... 345/581
7,957,611 B2 * 6/2011 Zhu et al. ...................... 382/300

(Continued)

FOREIGN PATENT DOCUMENTS

JP 6-309452 A 11/1994

(Continued)

OTHER PUBLICATIONS

Hayit Greenspan, Charles H. Anderson and Sofia Akber, Image Enhancement by Nonlinear Extrapolation in Frequency Space, IEEE Transactions on Image Processing, vol. 9, No. 6, Jun. 2000, pp. 1035-1047.*

(Continued)

Primary Examiner — Hau Nguyen
Assistant Examiner — Leon T Cain, II
(74) Attorney, Agent, or Firm — Birch, Stewart, Kolasch & Birch, LLP

(57) ABSTRACT

There are provided a first image enlarging means (2A) for enlarging the input image (Din) and outputting a first enlarged image (D2A); a high-frequency component image generating means (1) for extracting a high-frequency component of the input image (Din) and generating a first high-frequency component image (D1); a second image enlarging means (2B) for enlarging the first high-frequency component image (D1) and outputting a second enlarged image (D2B); a high-frequency component image processing means (3) for processing the second enlarged image (D2B) and generating a second high-frequency component image (D3); and a means (4) for adding the first enlarged image (D2A) and the second high-frequency component image (D3) and outputting the result. This provides the enlarged image with adequate high-frequency components, and a sense of resolution of the enlarged image can be obtained.

21 Claims, 18 Drawing Sheets

U.S. PATENT DOCUMENTS

| | | | |
|---|---|---|---|
| 2001/0020950 A1 | 9/2001 | Shimizu et al. | |
| 2002/0030690 A1* | 3/2002 | Someya et al. | 345/598 |
| 2006/0045375 A1 | 3/2006 | Okuno et al. | |
| 2007/0237425 A1* | 10/2007 | Taguchi et al. | 382/299 |
| 2007/0258653 A1 | 11/2007 | Van Heesch et al. | |
| 2008/0025622 A1 | 1/2008 | Hanamoto et al. | |
| 2008/0068402 A1* | 3/2008 | Ioka et al. | 345/660 |
| 2008/0174694 A1* | 7/2008 | Morad et al. | 348/448 |
| 2008/0273744 A1* | 11/2008 | Kogure et al. | 382/100 |

FOREIGN PATENT DOCUMENTS

| | | |
|---|---|---|
| JP | 6-311346 A | 11/1994 |
| JP | 2001-251500 A | 9/2001 |
| JP | 2002-149105 A | 5/2002 |
| JP | 2008-33692 A | 2/2008 |
| WO | WO-2004/057534 A1 | 7/2004 |

OTHER PUBLICATIONS

Greenspan et al., "Image Enhancement by Nonlinear Extrapolation in Frequency Space", IEEE Transactions on Image Processing, vol. 9, No. 6, Jun. 2000, pp. 1035-1048.

Greenspan et al., "Image enhancement by non-linear extrapolation in frequency space", SPIE vol. 2182 Image and Video Processing II, 1994, pp. 2-13.

Extended European Search Report dated May 22, 2012, for corresponding European Patent Application No. 09718403.0.

\* cited by examiner

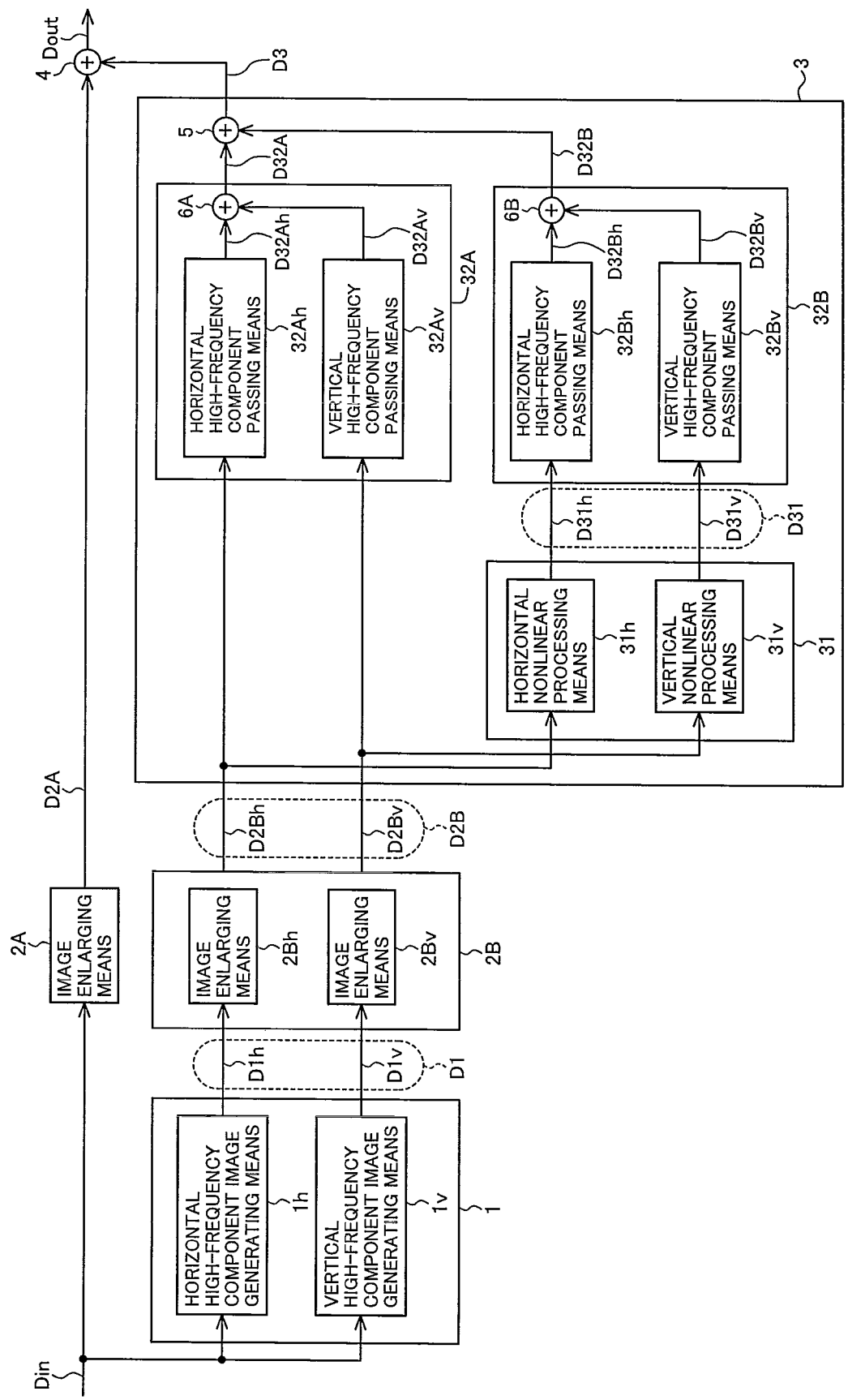

FIG.4(a)

| P11 | P21 | P31 | P41 |
|---|---|---|---|
| P12 | P22 | P32 | P42 |
| P13 | P23 | P33 | P43 |
| P14 | P24 | P34 | P44 |

| | 1 | 2 | 3 | 4 | 5 | 6 | 7 | 8 |
|---|---|---|---|---|---|---|---|---|
| 1 | P'11 | P'21 | P'31 | P'41 | P'51 | P'61 | P'71 | P'81 |
| 2 | P'12 | P'22 | P'32 | P'42 | P'52 | P'62 | P'72 | P'82 |
| 3 | P'13 | P'23 | P'33 | P'43 | P'53 | P'63 | P'73 | P'83 |
| 4 | P'14 | P'24 | P'34 | P'44 | P'54 | P'64 | P'74 | P'84 |
| 5 | P'15 | P'25 | P'35 | P'45 | P'55 | P'65 | P'75 | P'85 |
| 6 | P'16 | P'26 | P'36 | P'46 | P'56 | P'66 | P'76 | P'86 |
| 7 | P'17 | P'27 | P'37 | P'47 | P'57 | P'67 | P'77 | P'87 |
| 8 | P'18 | P'28 | P'38 | P'48 | P'58 | P'68 | P'78 | P'88 |

| 1 | 2 | 1 |
|---|---|---|
| 2 | 4 | 2 |
| 1 | 2 | 1 |

| | 1 | 2 | 3 | 4 | 5 | 6 | 7 | 8 |
|---|---|---|---|---|---|---|---|---|
| 1 | Q11 | Q21 | Q31 | Q41 | Q51 | Q61 | Q71 | Q81 |
| 2 | Q12 | Q22 | Q32 | Q42 | Q52 | Q62 | Q72 | Q82 |
| 3 | Q13 | Q23 | Q33 | Q43 | Q53 | Q63 | Q73 | Q83 |
| 4 | Q14 | Q24 | Q34 | Q44 | Q54 | Q64 | Q74 | Q84 |
| 5 | Q15 | Q25 | Q35 | Q45 | Q55 | Q65 | Q75 | Q85 |
| 6 | Q16 | Q26 | Q36 | Q46 | Q56 | Q66 | Q76 | Q86 |
| 7 | Q17 | Q27 | Q37 | Q47 | Q57 | Q67 | Q77 | Q87 |
| 8 | Q18 | Q28 | Q38 | Q48 | Q58 | Q68 | Q78 | Q88 |

↓ Y

IMAGE PROCESSING APPARATUS AND METHOD AND IMAGE DISPLAY APPARATUS AND METHOD

FIELD OF THE INVENTION

The present invention relates to an image processing apparatus and method and an image display apparatus and method for enlarging a digitized image, in which an enlarged image with high perceived resolution is obtained by generating high-frequency components when the image is enlarged.

BACKGROUND ART

When the number of pixels in an output image is greater than the number of pixels in the input image, an image processing apparatus must generally carry out an image enlargement process. In conventional image processing apparatus, the image is enlarged by taking weighted sums of the pixel values of pixels neighboring the pixel of interest.

The image processing apparatus described in Patent Document 1, for example, has a computational circuit for multiplying the data of five pixels mutually adjacent in the main scanning direction, which are output from shift registers, by predetermined weighting constants, and adding the resulting products obtained from the pixel data; in image data enlargement processing, the result of this computation in the computational circuit is selected by a selector as the pixel data at the center of these pixel data.

Patent Document 1: Japanese Patent Application Publication No. H6-311346 (FIG. 1)

DISCLOSURE OF THE INVENTION

Problems to be Solved by the Invention

Weighting and adding the pixel values of pixels in a vicinity of the pixel of interest is a low-pass filtering process that passes only low-frequency components of the input image. A problem with the above conventional art is accordingly that the perceived resolution of the enlarged image is lost, because the enlarged image cannot be given adequate high-frequency components.

Means of Solution of the Problems

This problem is addressed by the present invention, in which an image processing apparatus includes:

a first image enlarging means for enlarging the input image and outputting a first enlarged image;

a high-frequency component image generating means for extracting a high-frequency component of the input image and generating a first high-frequency component image;

a second image enlarging means for enlarging the first high-frequency component image and outputting a second enlarged image;

a high-frequency component image processing means for extracting a high-frequency component of the second enlarged image and generating a second high-frequency component image; and a means for adding the first enlarged image and the second high-frequency component image to generate an output image.

EFFECT OF THE INVENTION

The present invention can provide an enlarged image with adequate high-frequency components, producing an enlarged image with a sense of resolution.

BRIEF DESCRIPTION OF THE DRAWINGS

FIG. 3 is a still more detailed block diagram of the image processing apparatus in the first embodiment of the invention.

FIGS. 4(a) to 4(d) are explanatory diagrams illustrating the operation of image enlarging means 2A.

Figure 1:
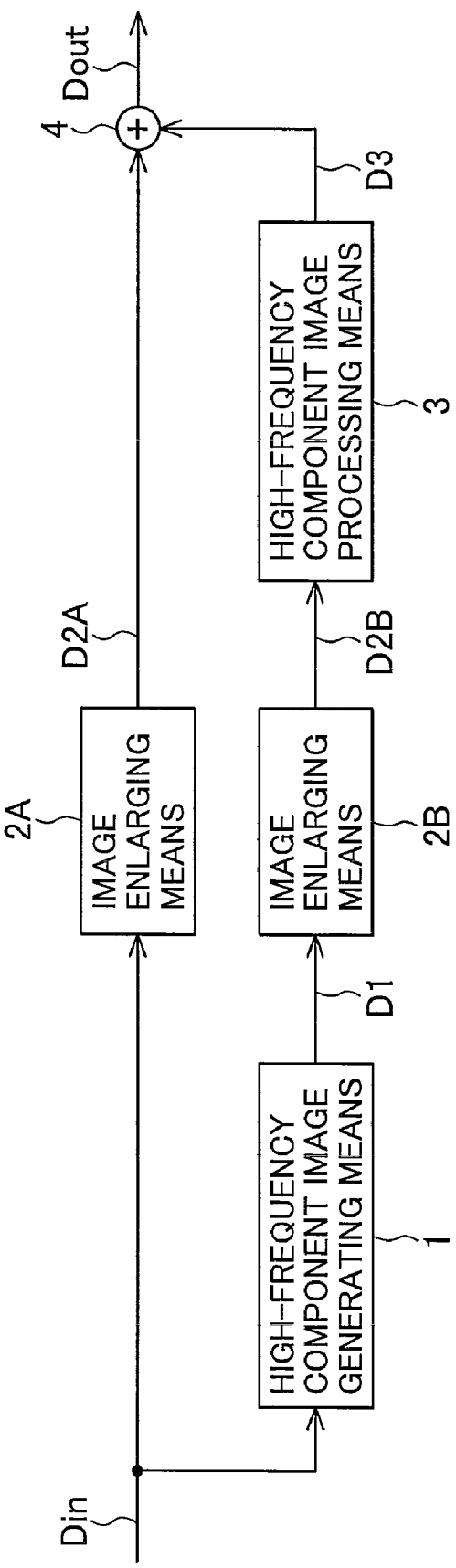
FIG. 1 is a block diagram of an image processing apparatus in a first embodiment of the invention.

EXPLANATION OF REFERENCE CHARACTERS 1 high-frequency component image generating means, 2A image enlarging means, 2B image enlarging means, 3 high-frequency component image processing means, 4 adding means, Din input image, D1 high-frequency component image, D2A enlarged image, D2B enlarged image, D3 high-frequency component image, Dout output image

BEST MODE FOR CARRYING OUT THE INVENTION

First Embodiment

Figure 24:
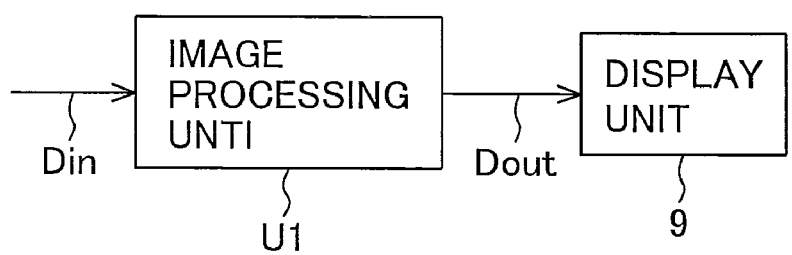
FIG. 24 is a block diagram showing an exemplary image display apparatus incorporating the image processing apparatus of the invention.

FIG. 1 is a diagram showing the structure of the image processing apparatus according to a first embodiment of the invention, which can be used as, for example, the image processing unit U1 in the image display apparatus shown in FIG. 24. The image display apparatus shown in FIG. 24 includes the image processing unit U1 and a display unit 9 for displaying images.

The image processing apparatus in the first embodiment has an image enlarging means 2A, a high-frequency component image generating means 1, an image enlarging means 2B, a high-frequency component image processing means 3, and an adding means 4.

Image enlarging means 2A enlarges an input image Din to generate an enlarged image D2A. The high-frequency component image generating means 1 extracts only the high-frequency components in the input image Din to generate a high-frequency component image D1. Image enlarging means 2B enlarges the high-frequency component image D1 output from the high-frequency component image generating means 1 to generate an enlarged image D2B. The high-frequency component image processing means 3 extracts the high-frequency components of the enlarged image D2B output from image enlarging means 2B to generate a high-frequency component image D3. The adding means 4 adds the enlarged image D2A output from image enlarging means 2A and the high-frequency component image D3 output from the high-frequency component image processing means 3 and outputs the result as a final enlarged image: specifically, as an output image Dout. The output of the adding means 4 is supplied to the display unit 9 in the image display apparatus shown in FIG. 24 and used for image display by the display unit 9.

Processes such as enlargement, high frequency generation, and high-frequency component processing are described as being performed on 'images' in the present embodiment, but they are actually performed on digital data representing the images. The term 'image' as used herein may also mean 'image data'.

While the operation of the image enlarging means 2A, high-frequency component image generating means 1, image enlarging means 2B, and high-frequency component image processing means 3 will be described in detail below, the frequency components of high-frequency component image D3 are in a higher frequency band than the frequency components of enlarged image D2A. Accordingly, an enlarged image Dout including many high-frequency components can be obtained by adding high-frequency component image D3 to enlarged image D2A in the adding means 4.

Image enlarging means 2A enlarges the image in at least one of the horizontal and vertical directions; it may, for example, enlarge by the same factor in both the horizontal and vertical directions; alternatively, it may enlarge by different factors in the horizontal and vertical directions. Image enlarging means 2A may enlarge the image in just the horizontal direction or just the vertical direction; for example, if the display screen is horizontally wider than the input image, the image may be enlarged only in the horizontal direction.

The operation of image enlarging means 2A, the high-frequency component image generating means 1, image enlarging means 2B, and the high-frequency component image processing means 3 will now be described in more detail. This description will further clarify the actions and effects of the invention.

Figure 2:
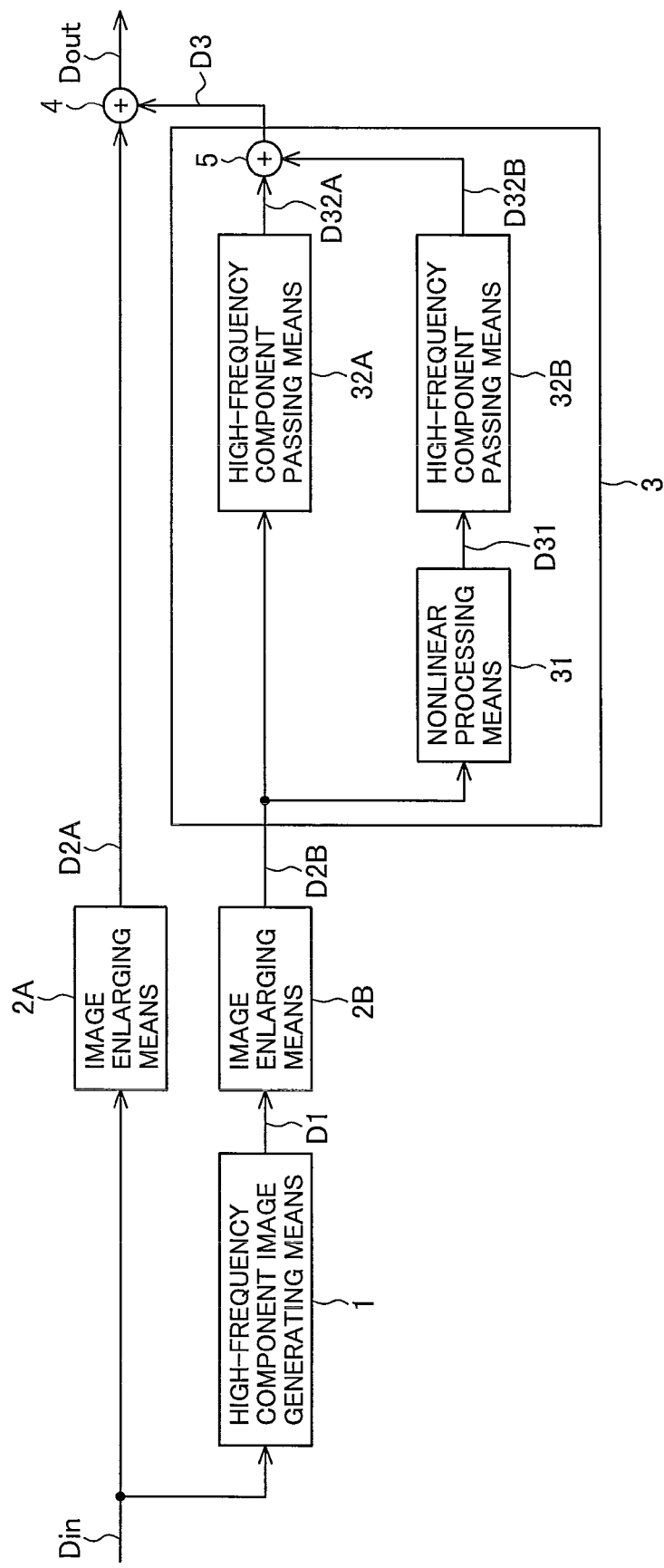
FIG. 2 is a more detailed block diagram of the image processing apparatus in the first embodiment of the invention.

FIG. 2 shows the detailed structure of the image processing apparatus in the first embodiment of the invention shown in FIG. 1, particularly illustrating the structure of the high-frequency component image processing means 3.

The high-frequency component image processing means 3 comprises a high-frequency component passing means 32A, a nonlinear processing means 31, a high-frequency component passing means 32B, and an adding means 5.

High-frequency component passing means 32A extracts only the high-frequency components included in enlarged image D2B to generate an intermediate image D32A. The nonlinear processing means 31 carries out nonlinear processing on enlarged image D2B to sharpen edges as described later and generates a nonlinearly processed image D31; high-frequency component passing means 32B extracts only the high-frequency components included in the nonlinearly processed image D31 to generate an intermediate image D32B. The result of the addition of intermediate image D32A and intermediate image D32B by adding means 5 is then output as high-frequency component image D3.

FIG. 3 shows the still more detailed structure of the image processing apparatus in the first embodiment of the invention shown in FIG. 1, particularly illustrating the detailed structure of the high-frequency component image generating means 1, image enlarging means 2B, high-frequency component passing means 32A, nonlinear processing means 31, and high-frequency component passing means 32B. The operation of the components of the image processing apparatus shown in FIG. 3 will be described below.

The high-frequency component image generating means 1 comprises a horizontal high-frequency component image generating means 1h and a vertical high-frequency component image generating means 1v, which respectively generate a horizontal high-frequency component image D1h and a vertical high-frequency component image D1v. These high-frequency component images D1h and D1v constitute high-frequency component image D1.

Image enlarging means 2B comprises an image enlarging means 2Bh for generating an enlarged image D2Bh by enlarging the horizontal high-frequency component image D1h and an image enlarging means 2Bv for generating an enlarged image D2Bv by enlarging the vertical high-frequency component image D1v. These enlarged images D2Bh and D2Bv constitute enlarged image D2B.

If image enlarging means 2A performs enlargement in both the horizontal and vertical directions, image enlarging means 2Bh enlarges the horizontal high-frequency component image D1h in both the horizontal and vertical directions, and image enlarging means 2Bv enlarges the vertical high-frequency component image D1v in both the horizontal and vertical directions. The horizontal and vertical high-frequency component images D1h and D1v are enlarged by image enlarging means 2Bh and 2Bv with the same horizontal and vertical enlargement factors as used by image enlarging means 2A.

High-frequency component passing means 32A comprises a horizontal high-frequency component passing means 32Ah for extracting only the horizontal high-frequency components included in enlarged image D2Bh to generate an intermediate image D32Ah, a vertical high-frequency component passing means 32Av for extracting only the vertical high-frequency components included in enlarged image D2Bv to generate an intermediate image D32Av, and an adding means 6A for adding intermediate image D32Ah and intermediate image D32Av; the result of the addition of the intermediate images D32Ah and D32Av in adding means 6A is output as intermediate image D32A.

The nonlinear processing means 31 comprises a horizontal nonlinear processing means 31h that nonlinearly processes enlarged image D2Bh by a method described later to generate a nonlinearly processed image D31h which has been nonlinearly processed to sharpen edges including step variations in the signal values of horizontally aligned pixels, and a vertical nonlinear processing means 31v that nonlinearly processes enlarged image D2Bv by a method described later to generate a nonlinearly processed image D31v which has been nonlinearly processed to sharpen edges including step variations in the signal values of vertically aligned pixels. These nonlinearly processed images D31h and D31v constitute nonlinearly processed image D31.

High-frequency component passing means 32B comprises a horizontal high-frequency component passing means 32Bh for extracting only the high-frequency components included in nonlinearly processed image D31h to generate an intermediate image D32Bh, a vertical high-frequency component passing means 32Bv for extracting only the high-frequency components included in nonlinearly processed image D31v to generate an intermediate image D32Bv, and an adding means 6B for adding intermediate image D32Bh and intermediate image D32Bv; the result of addition of the intermediate images D32Bh and D32Bv in adding means 6A is output as intermediate image D32B.

The operations of the components of the image processing apparatus shown in FIG. 3 will now be described in detail by taking an exemplary case in which the input image Din is doubled in size in both the horizontal and vertical directions to generate an enlarged image Dout.

Figure 5:
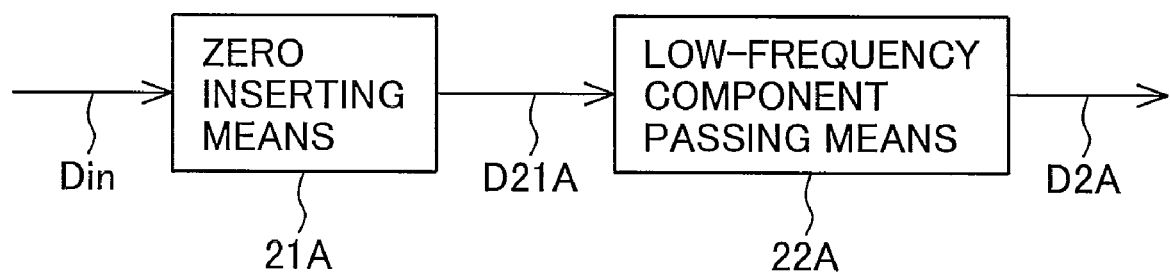
FIG. 5 is a block diagram of image enlarging means 2A.

First, the operation of image enlarging means 2A will be described. Image enlarging means 2A enlarges the input image Din by a factor of two in both the horizontal and vertical directions to generate enlarged image D2A. FIGS. 4(a) to 4(d) schematically illustrate an exemplary procedure for generating enlarged image D2A in image enlarging means 2A; FIG. 5 is a drawing showing an example of image enlarging means 2A.

Image enlarging means 2A comprises a zero inserting means 21A and a low-frequency component passing means 22A. The operation of the zero inserting means 21A and the low-frequency component passing means 22A will now be described with reference to FIGS. 4(a) to 4(d). FIG. 4(a) represents the input image Din (more particularly, the pixel array constituting a part of the image); FIG. 4(b) represents a zero inserted image D21A generated in the zero inserting means 21A; FIG. 4(c) represents the filtering coefficients used in generating enlarged image D2A in the low-frequency component passing means 22A; FIG. 4(d) represents the enlarged image D2A generated in the low-frequency component passing means 22A.

The zero inserting means 21A generates the zero inserted image D21A by inserting pixels with pixel value zero into the input image Din, one for each pixel (of the input image Din), in the horizontal direction (inserting one pixel between each two mutually adjacent pixels) and inserting one line for each line (of the input image Din) in the vertical direction (inserting one line between each two mutually adjacent lines).

If 'PXY' represents the pixel at coordinates (X, Y) in the input image Din and 'P'XY' represents the pixel value at the coordinates (X, Y) in the zero inserted image D21A, then as a result of zero insertion, the pixel value represented as P'(2X−1)(2Y−1) in the zero inserted image D21A is equal to PXY included in the input image Din, and the pixel values represented as P'(2X−1)(2Y), P'(2X)(2Y), and P'(2X)(2Y−1) are equal to zero.

The low-frequency component passing means 22A performs the filtering operation represented by the filter coefficients shown in FIG. 4(c) on the zero inserted image D21A to generate the enlarged image D2A shown in FIG. 4(d).

For example, the pixel value QXY of the pixel at coordinates (X, Y) in enlarged image D2A is calculated as in equation (1) below.

$$QXY = (4/16) \times \{P'(X-1)(Y-1) + 2P'X(Y-1) + \\ P'(X+1)(Y-1) + 2P'(X-1)Y + 4P'XY + 2P'(X+1)Y + \\ P'(X-1)(Y+1) + 2P'X(Y+1) + P'(X+1)(Y+1)\} \quad (1)$$

The filtering coefficients represented in FIG. 4(c) are for low-pass filtering, so the process represented by equation (1) which is performed in the low-frequency component passing means 22A is equivalent to extracting a low frequency component of the zero inserted image D21A.

In the equation (1), some of the pixel values represented as P'XY are equal to zero, and the pixel values which are not equal to zero are equal to the pixel values of the input image Din. Accordingly, the process of equation (1) or the enlarging process is equivalent to weighted average calculation of the pixel values of the image before the enlargement (input image Din).

Next, the operation of the horizontal high-frequency component image generating means 1h and vertical high-frequency component image generating means 1v will be described. The horizontal high-frequency component image generating means 1h performs a high-pass filtering operation on the input image Din by using the pixels in the input image Din and, for example, a given number of pixels neighboring each pixel in the horizontal direction to generate the horizontal high-frequency component image D1h.

The vertical high-frequency component image generating means 1v performs a high-pass filtering operation on the input image Din by using the pixels in the input image Din and, for example, a given number of pixels neighboring each pixel in the vertical direction to generate the vertical high-frequency component image D1v.

The horizontal high-frequency component image D1h includes horizontal high-frequency components of the input image Din; the vertical high-frequency component image D1v includes vertical high-frequency components of the input image Din.

The high-pass filtering operation in the horizontal high-frequency component image generating means 1h can be performed by, for example, subtracting the low frequency component in the horizontal direction (or, for each pixel, the simple average or a weighted average of the values of the pixels in a local area consisting of a given number of pixels aligned in the horizontal direction) from the signal input to the horizontal high-frequency component image generating means 1h to extract the high-frequency component.

Similarly, the high-pass filtering operation in the vertical high-frequency component image generating means 1v can be performed by, for example, subtracting the low frequency component in the vertical direction (or, for each pixel, the simple average or a weighted average of the values of the pixels in a local area consisting of a given number of pixels aligned in the vertical direction) from the signal input to the vertical high-frequency component image generating means $1v$ to extract the high-frequency component.

Next the operation of image enlarging means 2Bh and 2Bv will be described. Image enlarging means 2Bh enlarges the horizontal high-frequency component image D1$h$ by a factor of two in both the horizontal and vertical directions to generate enlarged image D2Bh; image enlarging means 2Bv enlarges the horizontal high-frequency component image D1$v$ by a factor of two in both the horizontal and vertical directions to generate enlarged image D2Bv.

Figure 6:
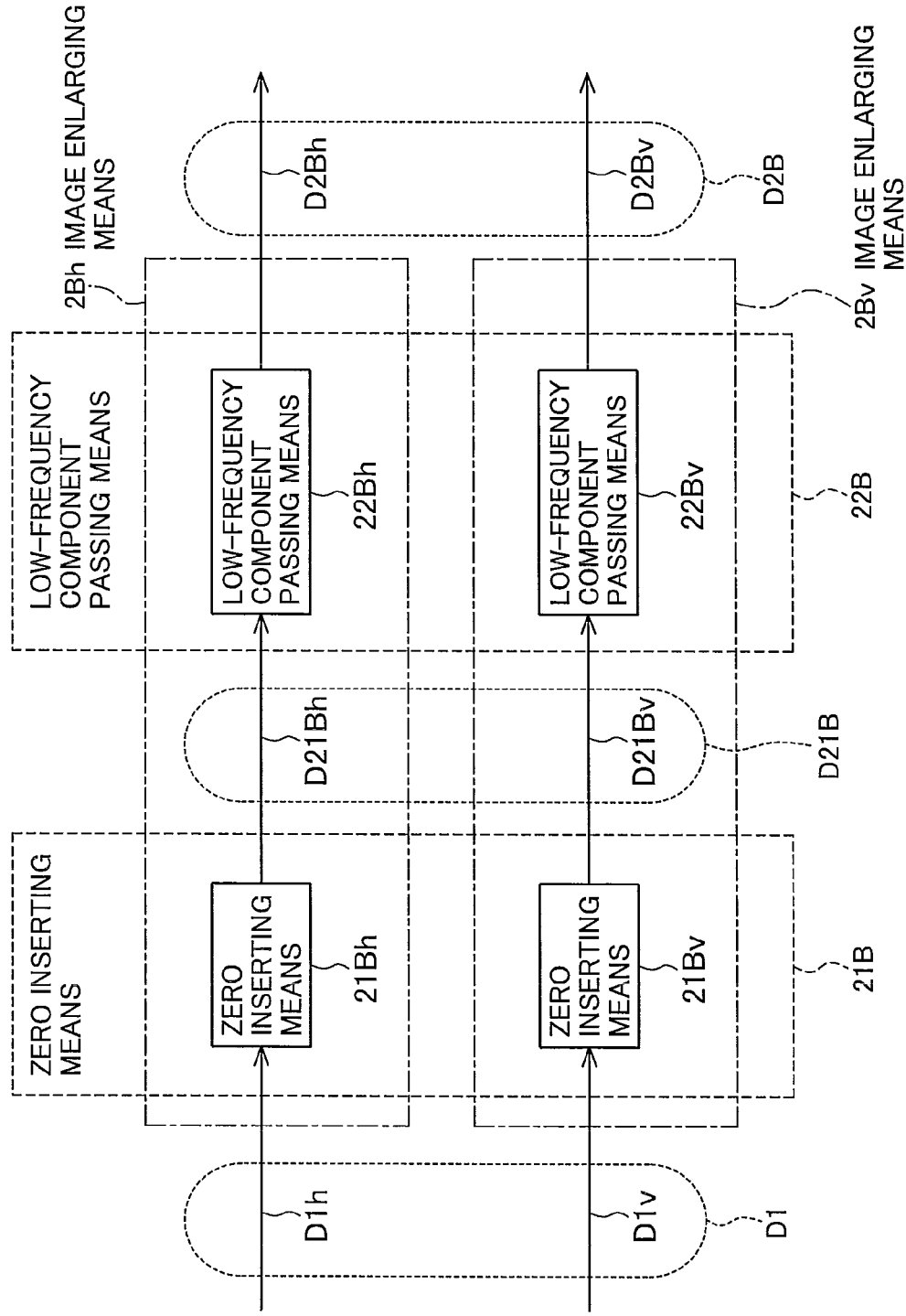
FIG. 6 is a block diagram of image enlarging means 2B.

Image enlarging means 2Bh and image enlarging means 2Bv can be structured in the same way as the image enlarging means 2A described with reference to FIG. 5. Accordingly, image enlarging means 2B, comprising image enlarging means 2Bh and image enlarging means 2Bv, can be represented as in FIG. 6.

The input to image enlarging means 2Bh is the horizontal high-frequency component image D1$h$ and the output from image enlarging means 2Bh is enlarged image D2Bh.

Image enlarging means 2Bh comprises a zero inserting means 21Bh and a low-frequency component passing means 22Bh; image enlarging means 2Bv comprises a zero inserting means 21Bv and a low-frequency component passing means 22Bv.

Zero inserting means 21Bh and 21Bv are both similar to the zero inserting means 21A in FIG. 5; low-frequency component passing means 22Bh and 22Bv are both similar to the low-frequency component passing means 22A in FIG. 5.

The zero inserted image D21Bh output from zero inserting means 21Bh and the zero inserted image D21Bv output from zero inserting means 21Bv constitute the zero inserted image D21B output from zero inserting means 21B.

The enlarged image D2Bh output from low-frequency component passing means 22Bh and the enlarged image D2Bv output from low-frequency component passing means 22Bv constitute the enlarged image D2B output from low-frequency component passing means 22B.

Next, the operation of high-frequency component passing means 32A will be described. High-frequency component passing means 32A includes horizontal high-frequency component passing means 32Ah, vertical high-frequency component passing means 32Av, and adding means 6A.

Horizontal high-frequency component passing means 32Ah performs a high-pass filtering operation on enlarged image D2Bh to generate an intermediate image D32Ah.

Vertical high-frequency component passing means 32Av performs a high-pass filtering operation on enlarged image D2Bv to generate an intermediate image D32Av.

Adding means 6A adds intermediate image D32Ah and intermediate image D32Av to generate intermediate image D32A. The intermediate image D32A generated in this way is output from high-frequency component passing means 32A.

The high-pass filtering processing in horizontal high-frequency component passing means 32Ah is performed in the same way as in the horizontal high-frequency component image generating means 1$h$; the high-pass filtering processing in vertical high-frequency component passing means 32Av can be performed in the same way as in the vertical high-frequency component image generating means 1$v$.

That is, the high-pass filtering processing in horizontal high-frequency component passing means 32Ah, like the processing in the horizontal high-frequency component image generating means 1$h$, can be performed by, for example, subtracting the low frequency component in the horizontal direction (or, for each pixel, the simple average or a weighted average of the values of the pixels in a local area consisting of a given number of pixels aligned in the horizontal direction) from the signal input to horizontal high-frequency component passing means 32Ah to extract the high-frequency component.

Similarly, the high-pass filtering processing in vertical high-frequency component passing means 32Av can be performed by, for example, subtracting the low frequency component in the vertical direction (or, for each pixel, the simple average or a weighted average of the values of the pixels in a local area consisting of a given number of pixels aligned in the vertical direction) from the signal input to vertical high-frequency component passing means 32Av to extract the high-frequency component.

Next the operation of the nonlinear processing means 31 will be described. The nonlinear processing means 31 comprises a horizontal nonlinear processing means 31$h$ and a vertical nonlinear processing means 31$v$. The horizontal nonlinear processing means 31$h$ and vertical nonlinear processing means 31$v$ have similar structures. The horizontal nonlinear processing means 31$h$ performs horizontal processing and the vertical nonlinear processing means 31$v$ performs vertical processing.

Figure 7:
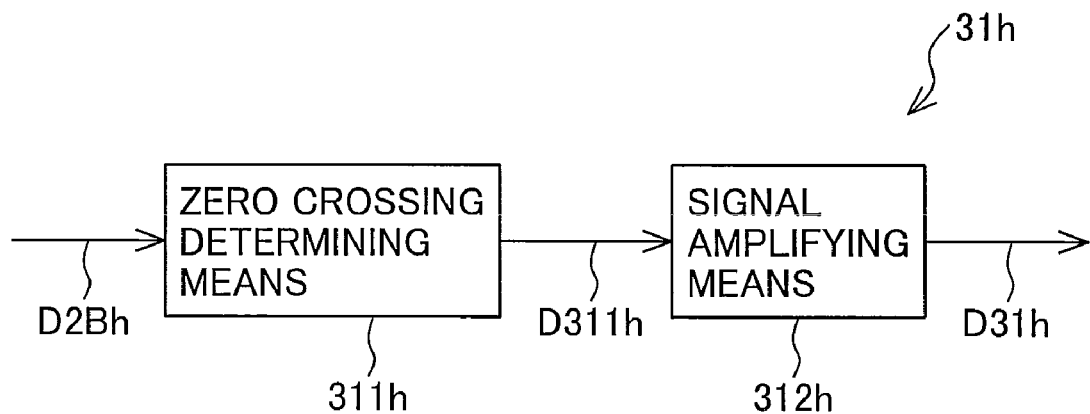
FIG. 7 is a block diagram of the horizontal nonlinear processing means 31h.

FIG. 7 illustrates the internal structure of the horizontal nonlinear processing means 31$h$. The horizontal nonlinear processing means 31$h$ comprises a zero crossing determining means 311$h$ and a signal amplifying means 312$h$.

The zero crossing determining means 311$h$ checks variations in the pixel values of the input enlarged image D2Bh in the horizontal direction. The zero crossing determining means 311$h$ takes points where the pixel values change from positive to negative or vice versa as zero crossing points and informs the signal amplifying means 312$h$ of the positions of the pixels before and after (in the example shown, one pixel just before and one pixel just after) the zero crossing points by a signal D311$h$.

In the horizontal nonlinear processing means 31$h$, the pixels positioned on the left and right of a zero crossing point are regarded as the pixels before and after the zero crossing point.

The signal amplifying means 312$h$ identifies the pixels before and after a zero crossing point from signal D311$h$, and amplifies the pixel values (increases the absolute values) of only the pixels before and after the zero crossing point to generate nonlinearly processed image D31$h$. That is, the amplification factor of the pixel values of the pixels before and after a zero crossing point is set to a value greater than 1, and the amplification factor of the pixel values of other pixels is set to 1.

This type of processing sharpens edges including step variations in the signal values of horizontally aligned pixels.

Figure 8:
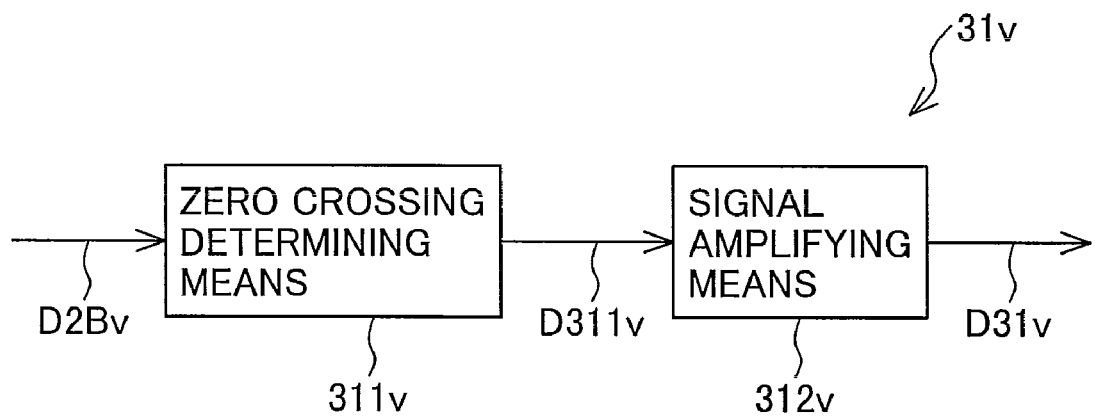
FIG. 8 is a block diagram of the vertical nonlinear processing means 31v.

FIG. 8 is a drawing illustrating the internal structure of the vertical nonlinear processing means 31$v$. The vertical nonlinear processing means 31$v$ comprises a zero crossing determining means 311$v$ and a signal amplifying means 312$v$.

Zero crossing determining means 311$v$ checks variations in the pixel values of the input enlarged image D2Bh in the vertical direction. Zero crossing determining means 311$v$ takes points where the pixel values change from positive to negative or vice versa as zero crossing points and informs signal amplifying means 312$v$ of the positions of the pixels before and after (in the example shown, one pixel just before and one pixel just after) the zero crossing points by a signal D311$v$.

In the vertical nonlinear processing means 31$v$, the pixels positioned above and below a zero crossing point are regarded as the pixels before and after the zero crossing point.

Signal amplifying means 312$v$ identifies the pixels before and after a zero crossing point from signal D311$v$, and amplifies the pixel values (increases the absolute values) of only the pixels before and after the zero crossing point to generate nonlinearly processed image D31v. That is, the amplification factor of the pixel values of the pixels before and after a zero crossing point is set to a value greater than 1, and the amplification factor of the pixel values of other pixels is set to 1.

This type of processing sharpens edges including step variations in the signal values of vertically aligned pixels.

Next, the operation of high-frequency component passing means 32B will be described. High-frequency component passing means 32B comprises a horizontal high-frequency component passing means 32Bh, a vertical high-frequency component passing means 32Bv, and an adding means 6B.

Horizontal high-frequency component passing means 32Bh performs a high-pass filtering operation on enlarged image D2Bh to generate an intermediate image D32Bh. Vertical high-frequency component passing means 32Bv performs a high-pass filtering operation on enlarged image D2Bv to generate an intermediate image D32Bv. Adding means 6B adds intermediate image D32Bh and intermediate image D32Bv to generate intermediate image D32B. The intermediate image D32B generated in this way is output from high-frequency component passing means 32B.

The high-pass filtering processing in horizontal high-frequency component passing means 32Bh can be performed in the same way as in the horizontal high-frequency component image generating means 1h; the high-pass filtering operation in vertical high-frequency component passing means 32Bv can be performed in the same way as in the vertical high-frequency component image generating means 1v.

That is, the high-pass filtering processing in horizontal high-frequency component passing means 32Bh, like the processing in the horizontal high-frequency component image generating means 1h, can be performed by, for example, subtracting the low frequency component in the horizontal direction (or, for each pixel, the simple average or a weighted average of the values of the pixels in a local area consisting of a given number of pixels aligned in the horizontal direction) from the signal input to horizontal high-frequency component passing means 32Bh to extract the high-frequency component.

Similarly, the high-pass filtering processing in vertical high-frequency component passing means 32Bv can be performed by, for example, subtracting the low frequency component in the vertical direction (or, for each pixel, the simple average or a weighted average of the values of the pixels in a local area consisting of a given number of pixels aligned in the vertical direction) from the signal input to vertical high-frequency component passing means 32Bv to extract the high-frequency component.

Next, the operation of adding means 5 will be described. Adding means 5 adds the intermediate images D32A and D32B and outputs the result as a high-frequency component image D3.

Finally, the operation of adding means 4 will be described. Adding means 4 adds enlarged image D2A and high-frequency component image D3. The image obtained by the addition of enlarged image D2A and high-frequency component image D3 in adding means 4 is output from the image processing apparatus as the final enlarged image Dout.

The addition operation in adding means 4 is not limited to simple addition; it may be performed by weighting enlarged image D2A and high-frequency component image D3 with different values. This is also true for the adding means 5 in the high-frequency component image processing means 3, the adding means 6A in the high-frequency component passing means 32A, and the adding means 6B in the high-frequency component passing means 32B.

The actions and effects of the image processing apparatus of the invention will now be described.

The image processing apparatus in the present invention adds enlarged image D2A and high-frequency component image D3 to generate the final enlarged image (output image) Dout. Enlarged image D2A includes frequency components equivalent to frequencies lower than the Nyquist frequency Fn of the input image Din; high-frequency component image D3 includes frequency components equivalent to frequencies higher than the Nyquist frequency Fn of the input image Din. Accordingly, the enlarged image Dout generated by addition of enlarged image D2A and high-frequency component image D3 includes all frequency components up to the enlarged-image Nyquist frequency.

First, how it is that enlarged image D2A includes frequency components equivalent to frequencies lower than the Nyquist frequency Fn of the input image Din will be explained.

Figure 9A:
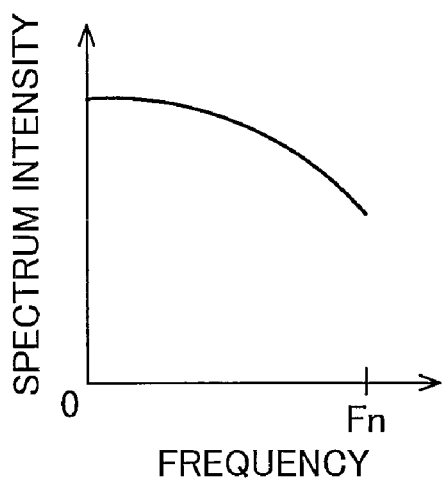
FIGS. 9(a) to 9(d) are diagrams illustrating frequency spectra of enlarged image D2A.
Figure 9B:
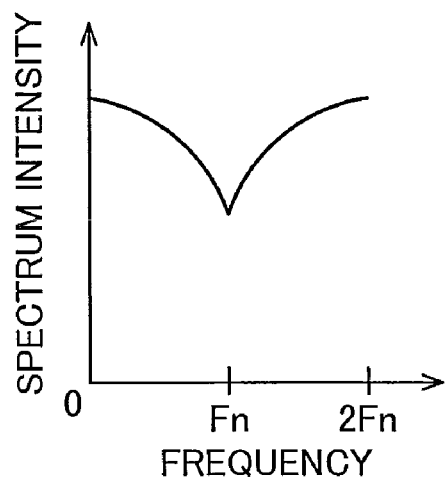
Figure 9C:
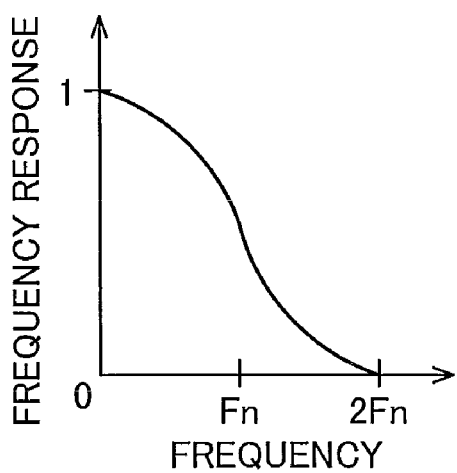
Figure 9D:
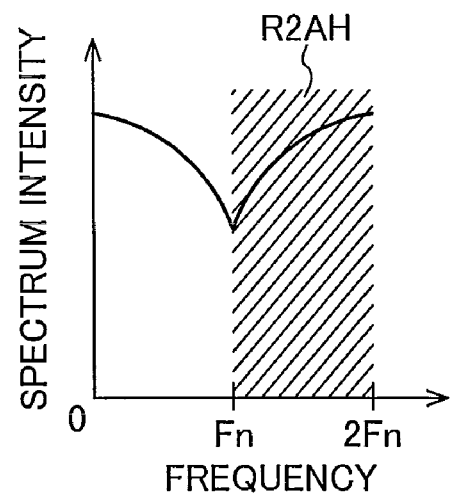

FIGS. 9(a) to 9(d) are diagrams schematically illustrating the actions that take place when enlarged image D2A is generated from the input image Din: FIG. 9(a) represents the frequency spectrum of the input image Din; FIG. 9(b) represents the frequency spectrum of zero inserted image D21A; FIG. 9(c) represents the frequency response of low-frequency component passing means 22A; FIG. 9(d) represents the frequency spectrum of enlarged image D2A.

The frequency spectrum of the input image Din will be described. Usually, natural images and the like are input as the input image Din, and their spectral intensities are concentrated around the origin of the frequency space. Accordingly, the frequency spectrum of the input image Din can be represented as FIG. 9(a). In FIG. 9(a), the vertical axis represents spectral intensity; the horizontal axis represents spatial frequency; Fn represents the Nyquist frequency of the input image Din.

Because the input image Din is generally a two-dimensional image, its frequency spectrum is represented in a frequency space that is also two dimensional, but its shape is the shape of the frequency spectrum shown in FIG. 9(a) expanding isotropically from the origin. Accordingly, for a minimal description of frequency spectra, it is only necessary to indicate the shape of a one-dimensional segment, and unless otherwise noted, shapes in frequency space will be described below by showing only a one dimensional segment.

Next, the frequency spectrum of zero inserted image D21A will be described. If zero inserting means 21A inserts one zero-valued pixel for each pixel (of the input image Din), aliasing occurs in the frequency space, centered on frequency Fn. As a result, the frequency spectrum of zero inserted image D21A is as shown in FIG. 9(b).

Next, the frequency response will be described. As mentioned earlier, the operation performed by low-frequency component passing means 22A is low-pass filtering, so as shown in FIG. 9(c), the frequency response of low-frequency component passing means 22A decreases as the frequency increases.

Finally, the frequency spectrum of enlarged image D2A will be described. Enlarged image D2A is generated by passage of the zero inserted image D21A with the frequency spectrum shown in FIG. 9(b) through the low-frequency component passing means 22A with the frequency response shown in FIG. 9(c). Accordingly, the frequency spectrum of enlarged image D2A is the frequency spectrum of the zero inserted image D21A with the high frequency region R2AH indicated by hatching eliminated.

Therefore, enlarged image D2A mainly includes frequency components equivalent to frequencies lower than the Nyquist frequency Fn of the input image Din.

Next, how it is that high-frequency component image D3 mainly includes frequency components equivalent to frequencies higher than the Nyquist frequency Fn of the input image Din will be explained. High-frequency component image D3 is obtained by adding intermediate image D32A and intermediate image D32B. Intermediate image D32A includes, in particular, frequency components equivalent to frequencies close to the Nyquist frequency of the input image Din and intermediate image D32B includes, in particular, frequency components equivalent to frequencies higher than the Nyquist frequency of the input image Din, and because the frequency components of intermediate image D32A and intermediate image D32B are added together in high-frequency component image D3, it includes frequency components equivalent to frequencies higher than the Nyquist frequency Fn of the input image Din.

First, the frequency spectrum of intermediate image D32A will be described.

Figure 10A:
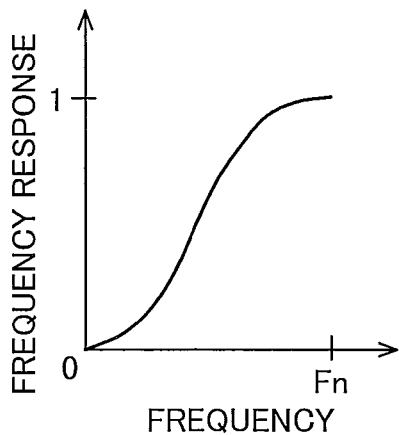
FIGS. 10(a) to 10(f) are diagrams illustrating frequency spectra of intermediate image D32A.
Figure 10B:
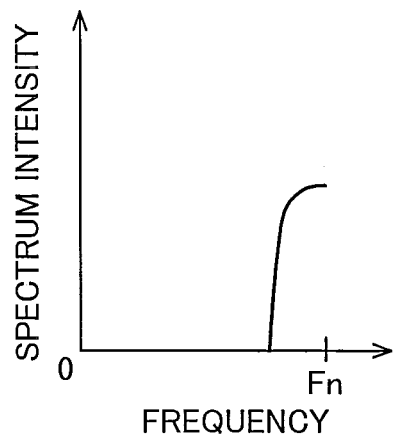
Figure 10C:
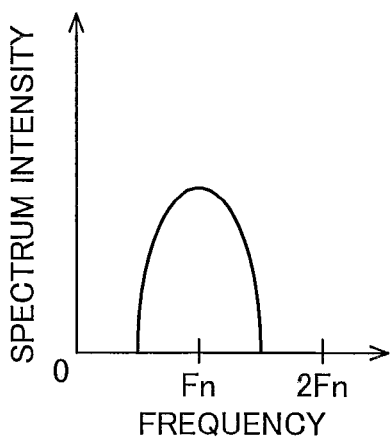
Figure 10D:
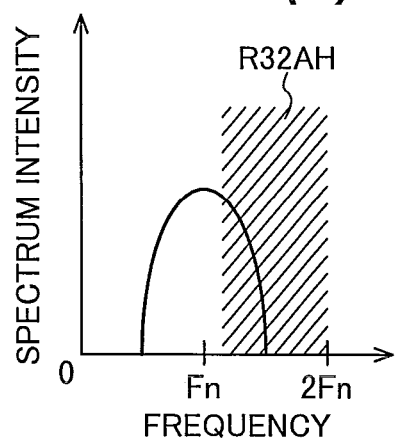
Figure 10E:
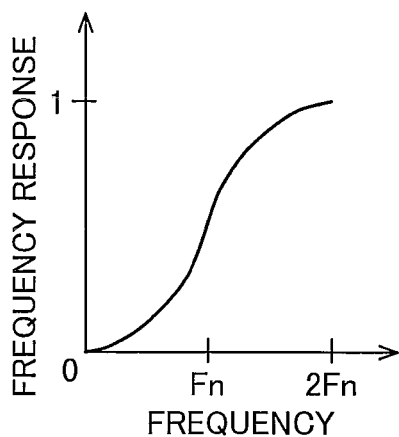
Figure 10F:
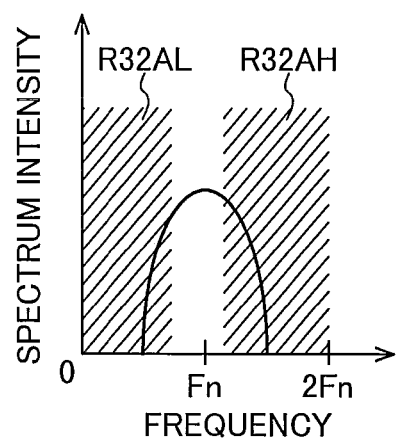

FIGS. 10(a) to 10(f) are drawings schematically illustrating the actions that take place when intermediate image D32A is generated: FIG. 10(a) represents the frequency response of the high-frequency component image generating means 1; FIG. 10(b) represents the frequency spectrum of high-frequency component image D1 (or D1h or D1v); FIG. 10(c) represents the frequency spectrum of the zero inserted image D21B (or D21Bh or D21Bv) generated by the zero inserting means 21B in image enlarging means 2B; FIG. 10(d) represents the frequency spectrum of enlarged image D2B (or D2Bh or D2Bv); FIG. 10(e) represents the frequency response of high-frequency component passing means 32A (or 32Ah or 32Av); FIG. 10(f) represents the frequency spectrum of the intermediate image D32A (or D32Ah or D32Av) output from high-frequency component passing means 32A.

First, the frequency response of the high-frequency component image generating means 1 and the frequency spectrum of high-frequency component image D1 will be described. The high-frequency component image generating means 1 generates high-frequency component image D1 by high-pass filtering, so as shown in FIG. 10(a), the frequency response of the high-frequency component image generating means 1 increases as the frequency increases. High-frequency component image D1 is obtained by passage of the input image Din with the frequency spectrum shown in FIG. 9(a) through a high-pass filter with the frequency response shown in FIG. 10(a), so the frequency spectrum of high-frequency component image D1 falls off in the lower frequency region and has a reasonable intensity only in the higher frequency region as shown in FIG. 10(b).

Next, the frequency spectrum of the zero inserted image D21B in image enlarging means 2B will be described. Because aliasing occurs in the zero inserting means 21B, as explained in the description of the zero inserting means 21A in image enlarging means 2A, the frequency spectrum of the zero inserted image D21B in image enlarging means 2B is as shown in FIG. 10(c).

Next the frequency response of enlarged image D2B will be described. When enlarged image D2B is generated, the frequency spectrum on the high-frequency component side of the zero inserted image D21B is eliminated by low-frequency component passing means 22B, so the frequency spectrum of enlarged image D2B is a spectrum with the high frequency region R32AH eliminated as shown in FIG. 10(d).

Finally, the frequency response of high-frequency component passing means 32A and the frequency spectrum of intermediate image D32A will be described. High-frequency component passing means 32A is a high-pass filter, so its frequency response increases with increasing frequency as shown in FIG. 10(e). Intermediate image D32A is generated by passage of the enlarged image D2B with the frequency spectrum shown in FIG. 10(d) through a high-pass filter with the frequency response shown in FIG. 10(e). Accordingly, the frequency response of intermediate image D32A is, as shown in FIG. 10(f), the frequency spectrum of the enlarged image D2B shown in FIG. 10(d) with the low frequency region R32AL also eliminated.

Therefore, intermediate image D32A mainly includes frequency components equivalent to frequencies near the Nyquist frequency Fn of the input image Din.

Next, the frequency spectrum of intermediate image D32B will be described.

Figure 11A:
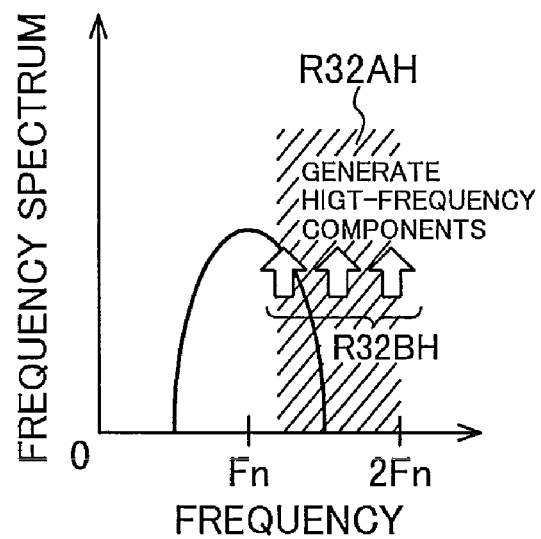
FIGS. 11(a) to 11(c) are diagrams illustrating frequency spectra of intermediate image D32B.
Figure 11B:
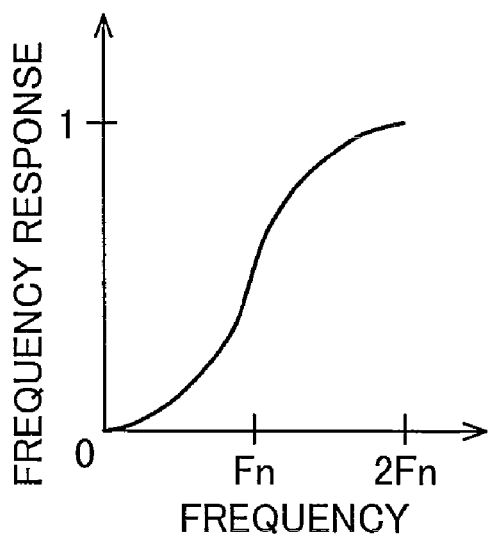
Figure 11C:
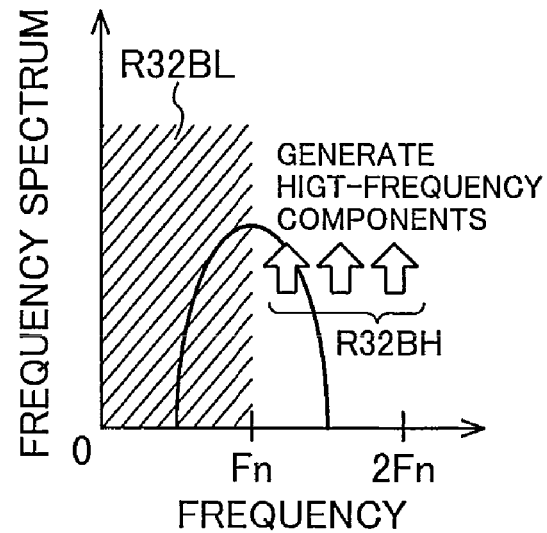

FIGS. 11(a) to 11(c) are drawings schematically illustrating the actions that take place when intermediate image D32B is generated: FIG. 11(a) indicates how high-frequency components are generated by the nonlinear processing means 31 (or 31h or 31v); FIG. 11(b) represents the frequency response of high-frequency component passing means 32B; FIG. 11(c) represents the frequency spectrum of intermediate image D32B.

As described later, high-frequency components equivalent to frequencies higher than the Nyquist frequency of the input image Din are generated in nonlinearly processed image D31. FIG. 11(a) schematically shows how this takes place. Intermediate image D32B is generated by passage of nonlinearly processed image D31 through high-frequency component passing means 32B. High-frequency component passing means 32B is a high-pass filter and, as shown in FIG. 11(b), its frequency response increases as the frequency increases. Accordingly, the frequency spectrum of intermediate image D32B is, as shown in FIG. 11(c), the frequency spectrum of nonlinearly processed image D31 with the low frequency region R32BL eliminated, so it is equivalent to frequencies higher than the Nyquist frequency Fn of the input image Din.

The frequency spectrum of intermediate image D32B will be described in more detail with reference to FIGS. 12(a) to 12(e) and FIGS. 13(a) to 13(f).

Figure 12A:
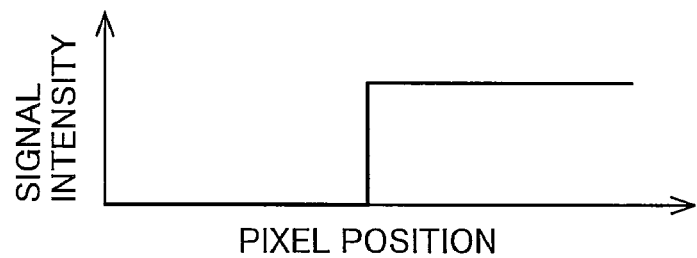
FIGS. 12(a) to 12(e) are diagrams illustrating a step edge signal, signals obtained when the step edge signal is sampled with different sampling frequencies, and their high-frequency components.

FIGS. 12(a) to 12(e) represent a step edge signal representing an image (step image) in which brightness, saturation, or another component value varies stepwise, signals obtained when the step edge signal is sampled with mutually differing sampling frequencies, and their high-frequency component signals. FIG. 12(a) represents the step edge signal.

Figure 12B:
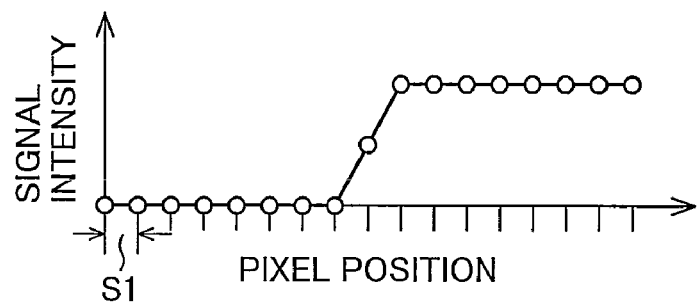
Figure 12C:
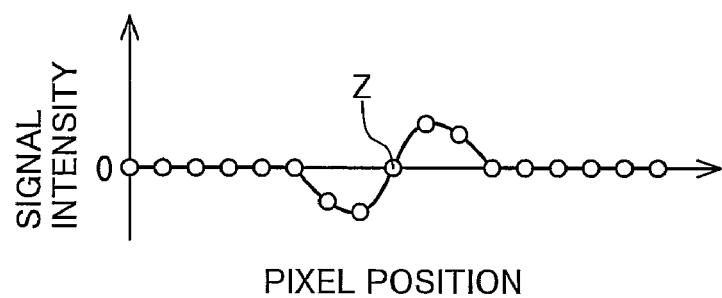
Figure 12D:
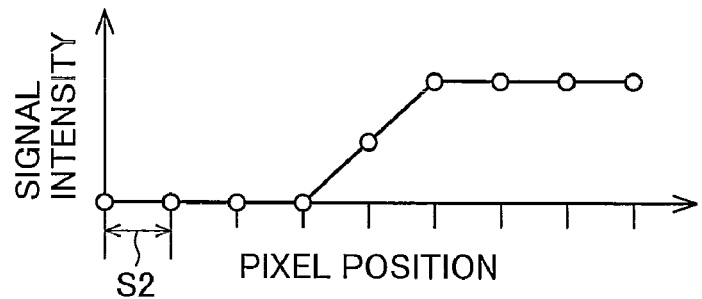
Figure 12E:
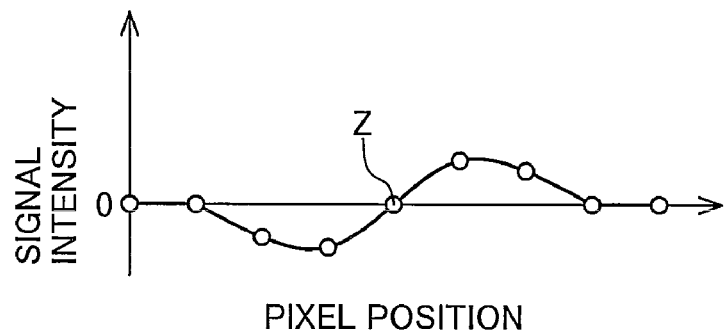

FIG. 12(b) represents a signal obtained by sampling the step edge signal with a sampling interval S1; FIG. 12(c) represents the high-frequency component of the signal obtained by sampling the step edge signal with the interval S1; FIG. 12(d) represents a signal obtained by sampling the step edge signal with a sampling interval S2; FIG. 12(e) represents the high-frequency component of the signal obtained by sampling the step edge signal with the interval S2.

Sampling interval S1 is shorter than sampling interval S2. Shortening the sampling interval is analogous to enlarging the image.

As shown in FIGS. 12(b) and 12(c) and FIGS. 12(d) and 12(e), the center of the edge appears as a zero crossing point Z in the high-frequency component signals (FIG. 12(c) and FIG. 12(e)). As is clear from a comparison of FIG. 12(b) and FIG. 12(c) and of FIG. 12(d) and FIG. 12(e), as the sampling interval is shortened (or as the image is enlarged), the slope of the high-frequency component signal before and after the zero crossing point Z grows steeper, and the positions of points indicating the local maximum and minimum values of the high-frequency components near the zero crossing point Z move closer to the zero crossing point Z.

Accordingly, when the image is enlarged, the high-frequency components in the input image Din are extracted, their variation is made steeper in the zero crossing vicinity, and the points at which their local maximum and minimum values occur in the zero crossing vicinity are brought closer to the zero crossing point, whereby high-frequency components that are not included in the resolution of the input image Din (or are equivalent to frequencies higher than the Nyquist frequency of the input image Din) are generated, sharpening the edges.

Figure 13A:
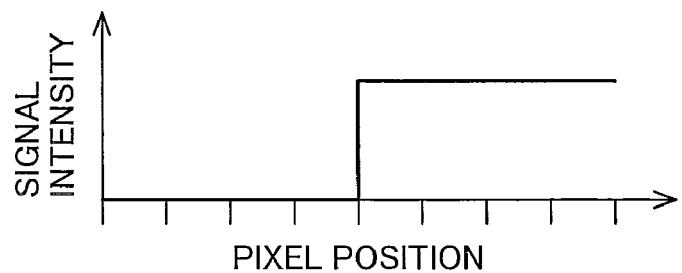
FIGS. 13(a) to 13(f) are diagrams illustrating the operation of the nonlinear processing means 31 and high-frequency component passing means 32B.
Figure 13B:
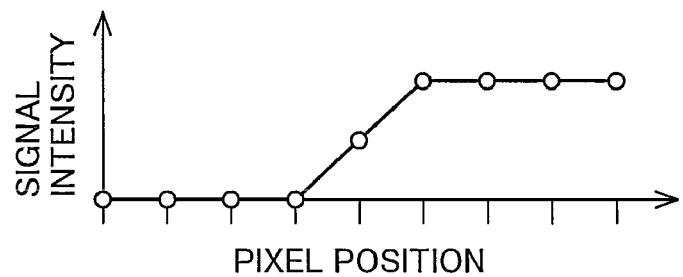
Figure 13C:
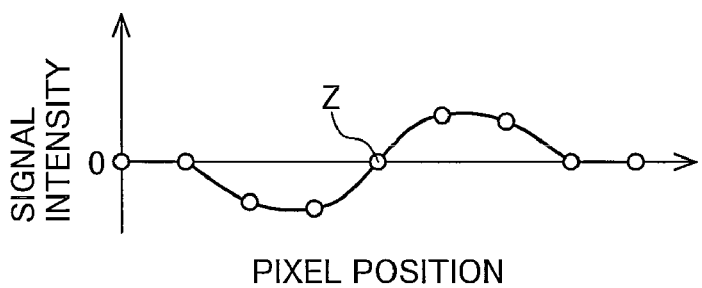
Figure 13D:
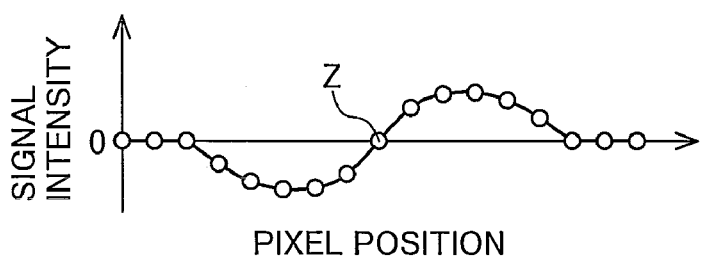
Figure 13E:
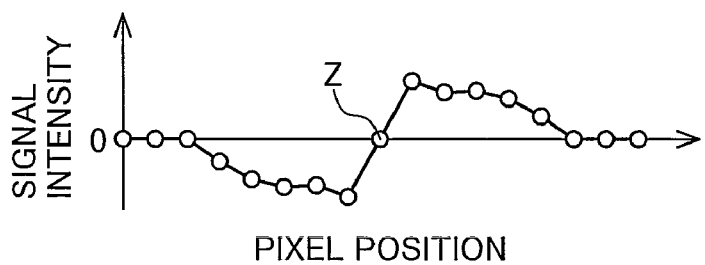
Figure 13F:
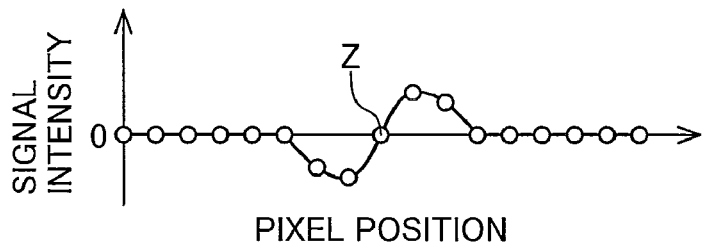

FIG. 13(a) to FIG. 13(f) are drawings schematically illustrating the procedure by which the high-frequency component image generating means 1, image enlarging means 2B, nonlinear processing means 31, and high-frequency component passing means 32B generate high-frequency components: FIG. 13(a) represents an image (step image) with a step variation in brightness, saturation, or another component value; FIG. 13(b) represents the input image Din corresponding to this step image; FIG. 13(c) represents high-frequency component image D1; FIG. 13(d) represents enlarged image D2B; FIG. 13(e) represents nonlinearly processed image D31; FIG. 13(f) represents intermediate image D32B. For simplicity, each is shown as a one-dimensional signal.

A description of the input image Din and high-frequency component image D1 for the step image will be omitted because they were described with reference to FIGS. 12(a) to FIG. 12(e); the description will start with the enlarged image D1.

The enlarged image D1 (or D1h or D1v) can be obtained by inserting one zero-valued pixel for each pixel (in the image D1) in high-frequency component image D1 in the zero inserting means 21B, and then by extracting the low frequency components in low-frequency component passing means 22B. Extracting low frequency components is analogous to determining the average pixel value in a local region of high-frequency component image D1 (FIG. 13(c)), so as shown in FIG. 13(d), enlarged image D2B (or D2Bh or D2Bv) is a signal with substantially the same shape as high-frequency component image D1 but with an increased number of samples.

Next, the nonlinearly processed image D31 will be described. The nonlinear processing means 31 detects the zero crossing point Z in the enlarged image D1, amplifies the values of the pixels before and after the zero crossing point Z, and outputs the resultant nonlinearly processed image D31. Accordingly, nonlinearly processed image D31 (or D31h or D31v) is a signal like the one shown in FIG. 13(e).

Finally, intermediate image D32B will be described. Intermediate image D32B is obtained by extracting the high-frequency components of nonlinearly processed image D31 (FIG. 13(e)) in high-frequency component passing means 32B.

In nonlinearly processed image D31 (FIG. 13(e)), because the pixel values of the pixels before and after the zero crossing point Z are amplified in the signal amplifying means 312h, 312v, the differences from the average pixel value in the local region increase. The pixel values of other pixels near the zero crossing point, however, are not amplified, so the differences from the average pixel value are small. Accordingly, in comparison with enlarged image D2B (FIG. 13(d)), in intermediate image D32B (FIG. 13(f)), the positions of the points indicating the local maximum and minimum values near the zero crossing point Z move closer to the zero crossing point Z. The closer to the zero crossing point Z the positions of points indicating the local maximum and minimum values near the zero crossing point Z move, the steeper the change in the signal near the zero crossing point Z becomes.

As described earlier, this means that intermediate image D32B includes high-frequency components not included in the resolution of the input image Din. In other words, the nonlinear processing means 31 generates high-frequency components equivalent to frequencies higher than the Nyquist frequency Fn of the input image Din by amplifying the pixel values before and after the zero crossing point of enlarged image D2B.

Intermediate image D32B is generated when the high-frequency components generated in the nonlinear processing means 31 are extracted in high-frequency component passing means 32B, so the image includes high-frequency components equivalent to frequencies higher than the Nyquist frequency Fn of the input image Din.

High-frequency component image D3 is obtained by adding intermediate image D32A and intermediate image D32B, so high-frequency component image D3 includes both the frequency components of intermediate image D32A and the frequency components of intermediate image D32B. High-frequency component passing means 32A includes frequency components equivalent to frequencies near the Nyquist frequency Fn of the input image Din, and high-frequency component passing means 32B includes frequency components equivalent to frequencies higher than the Nyquist frequency Fn of the input image Din, so high-frequency component image D3 includes frequency components equivalent to frequencies equal to or higher than the Nyquist frequency Fn. That is, a high-frequency component image D3 including frequency components equivalent to the frequencies equal to or higher than the Nyquist frequency Fn can be obtained by enlarging the high-frequency component image D1 generated by the high-frequency component image generating means 1 in image enlarging means 2B, and further processing it in the high-frequency component image processing means 3.

Figure 14:
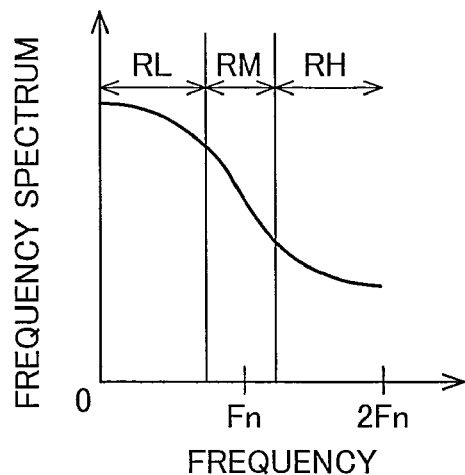
FIG. 14 is a diagram illustrating the frequency spectrum of the enlarged image Dout.

When added together, the frequency components of enlarged image D2A and high-frequency component image D3 appear as shown in FIG. 14. Enlarged image D2A mainly includes frequency components equivalent to frequencies lower than the Nyquist frequency Fn of the input image Din shown in a region RL. On the other hand, high-frequency component image D3 includes frequency components equivalent to frequencies near the Nyquist frequency Fn of the input image Din shown in region RM and equivalent to frequencies higher than the Nyquist frequency Fn of the input image Din in region RH. In other words, it includes frequency components equivalent to frequencies equal to or higher than the Nyquist frequency Fn of the input image Din.

As described above, the high-frequency component image D1 generated in the high-frequency component image generating means 1 is enlarged by image enlarging means 2B to generate an enlarged image D2B, which is processed by the high-frequency component image processing means 3, whereby a high-frequency component image D3 including frequency components equivalent to frequencies equal to or higher than the Nyquist frequency Fn of the input image Din can be obtained. Adding means 4 generates the enlarged image Dout by adding enlarged image D2A, which includes frequency components equivalent to frequencies in the region lower than the Nyquist frequency Fn of the input image Din, and high-frequency component image D3, which includes frequency components equivalent to frequencies in the region equal to and higher than the Nyquist frequency Fn in the input image Din, so the enlarged image Dout can be provided with adequate high-frequency components, producing an enlarged image Dout with a sense of resolution.

In addition, the high-frequency component image generating means 1 generates the horizontal high-frequency component image D1h obtained by extracting the horizontal high-frequency components and the vertical high-frequency component image D1v obtained by extracting the vertical high-frequency components, thereby making it possible to generate frequency components equivalent to frequencies equal to or higher than the Nyquist frequency Fn of the input image Din in either of the horizontal or vertical direction in the image. That is, horizontal high-frequency component passing means 32Ah horizontally high-pass filters the enlarged image D2Bh obtained by enlarging the horizontal high-frequency component image D1h in image enlarging means 2Bh, whereby an intermediate image D32Ah including frequency components equivalent to frequencies near the Nyquist frequency Fn of the input image Din in the horizontal direction is generated; vertical high-frequency component passing means 32Av vertically high-pass filters the enlarged image D2Bv obtained by enlarging the vertical high-frequency component image D1v in image enlarging means 2Bv, whereby an intermediate image D32Av including frequency components equivalent to frequencies near the Nyquist frequency Fn of the input image Din in the vertical direction is generated; adding means 6A generates intermediate image D32A by adding intermediate image D32Ah and intermediate image D32Av, whereby intermediate image D32A including frequency components equivalent to frequencies near the Nyquist frequency Fn of the input image Din in both the horizontal and vertical directions.

By performing high-pass filtering in the horizontal and vertical directions with mutually differing characteristics, it is also possible to generate intermediate images including frequency components equivalent to frequencies near the Nyquist frequency Fn to differing extents in the horizontal and vertical directions.

Horizontal high-frequency component passing means 32Bh performs high-pass filtering on the nonlinearly processed image D31h that the horizontal nonlinear processing means 31h generates by performing nonlinear processing on enlarged image D2Bh, whereby an intermediate image D32Bh including frequency components equivalent to frequencies higher than the Nyquist frequency Fn of the input image Din in the horizontal direction is generated; vertical high-frequency component passing means 32Bv performs high-pass filtering on the nonlinearly processed image D31v that the vertical nonlinear processing means 31v generates by performing nonlinear processing on enlarged image D2Bv, whereby an intermediate image D32Bv including frequency components equivalent to frequencies higher than the Nyquist frequency Fn of the input image Din in the vertical direction is generated.

By performing high-pass filtering in the horizontal and vertical directions with mutually differing characteristics, it is also possible to generate intermediate images including frequency components equivalent to frequencies higher than the Nyquist frequency Fn to differing extents in the horizontal and vertical directions.

As high-frequency component image D3 is obtained by adding intermediate image D32A and high-frequency component passing means 32B in adding means 5, a high-frequency component image D3 including frequency components equivalent to frequencies equal to or higher than the Nyquist frequency Fn of the input image Din in arbitrary directions can be obtained.

The above description has proceeded on the assumption that the enlargement factor used in generating the enlarged image Dout from the input image Din is two in both the horizontal and vertical directions, but the enlargement factor is not limited to two. That is, image enlarging means 2A may generate enlarged image D2A by enlarging the input image Din with any desired enlargement factor in both the horizontal and vertical directions, the high-frequency component image generating means 1 may generate high-frequency component image D1 from the input image Din, image enlarging means 2B may generate enlarged image D2B by enlarging high-frequency component image D1 with the desired enlargement factor in both the horizontal and vertical directions, the high-frequency component image processing means 3 may generate high-frequency component image D3 from enlarged image D2B, and adding means 4 may add enlarged image D2A and high-frequency component image D3 to obtain the final enlarged image Dout.

In the example shown in FIG. 3, the high-frequency component image generating means 1 includes the horizontal high-frequency component image generating means 1h and vertical high-frequency component image generating means 1v, image enlarging means 2B includes image enlarging means 2Bh and image enlarging means 2Bv, high-frequency component passing means 32A includes horizontal high-frequency component passing means 32Ah and vertical high-frequency component passing means 32Av, the nonlinear processing means 31 includes the horizontal nonlinear processing means 31h and vertical nonlinear processing means 31v, and high-frequency component passing means 32B includes horizontal high-frequency component passing means 32Bh and vertical high-frequency component passing means 32Bv. However, instead of this structure, another structure may be used in which the high-frequency component image generating means 1 includes only the horizontal high-frequency component image generating means 1h, image enlarging means 2B includes only image enlarging means 2Bh, the nonlinear processing means 31 includes only the horizontal nonlinear processing means 31h, high-frequency component passing means 32A includes only horizontal high-frequency component passing means 32Ah, the nonlinear processing means 31 includes only the horizontal nonlinear processing means 31h, and high-frequency component passing means 32B includes only horizontal high-frequency component passing means 32Bh, or in which the high-frequency component image generating means 1 includes only the vertical high-frequency component image generating means 1v, image enlarging means 2B includes only image enlarging means 2Bv, high-frequency component passing means 32A includes only vertical high-frequency component passing means 32Av, the nonlinear processing means 31 includes only the vertical nonlinear processing means 31v, and high-frequency component passing means 32B includes only vertical high-frequency component passing means 32Bv.

Although the above description assumes that only the amplification factor of one pixel before and one pixel after a zero crossing point is increased, control of the amplification factor is not limited to this scheme; for example, the scheme may be varied depending on the enlargement factor. A description will be given below with reference to FIGS. 15(a) to 15(e) and FIGS. 16(a) to 16(f).

Figure 15A:
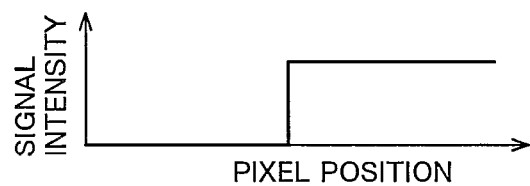
FIGS. 15(a) to 15(e) are diagrams illustrating a step edge signal, signals obtained when the step edge signal is sampled with different sampling frequencies, and their high-frequency components.
Figure 15B:
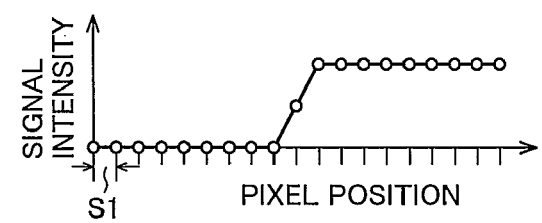
Figure 15C:
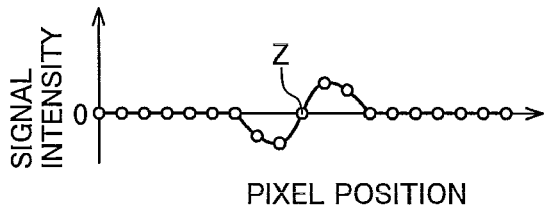
Figure 15D:
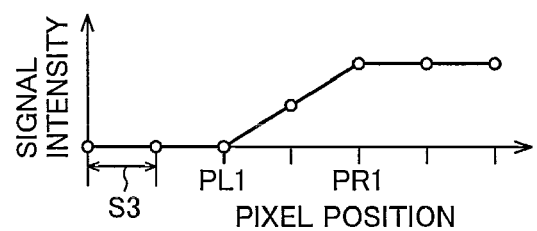
Figure 15E:
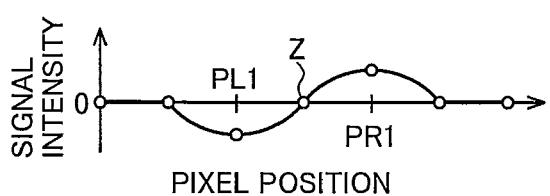

FIG. 15(a) represents a step edge signal. FIG. 15(b) represents a signal obtained by sampling the step edge signal with a sampling interval S1; FIG. 15(c) represents the high-frequency component of the signal (the signal shown in FIG. 15(b)) obtained by sampling the step edge signal with the interval S1; FIG. 15(d) represents a signal obtained by sampling the step edge signal with a sampling interval S3, three times the interval S1; FIG. 15(e) represents the high-frequency component of the signal obtained by sampling the step edge signal with interval S3. In FIGS. 15(a) to 15(e), pixel positions PL1 and PR1 indicate boundaries (starting and ending points of variation in brightness). In general, in a signal representing the high-frequency component of an image in which a step edge signal is sampled, the positions of pixels indicating the local maximum and minimum values of the high-frequency components near the zero crossing point Z substantially coincide with the positions of these boundaries of the step edge signal.

Figure 16A:
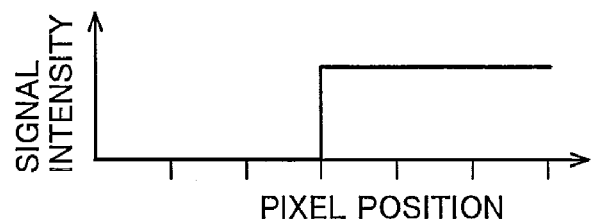
FIGS. 16(a) to 16(f) are diagrams illustrating the operation of the nonlinear processing means 31 and high-frequency component passing means 32B or the operation of step ST31 and high-frequency component passing means 32B.
Figure 16B:
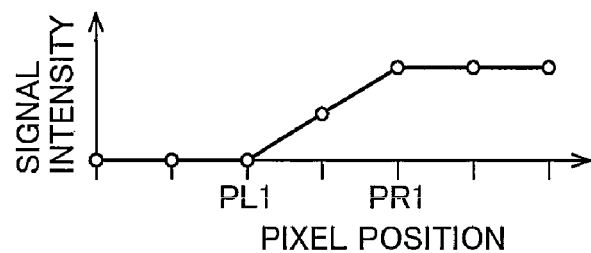
Figure 16C:
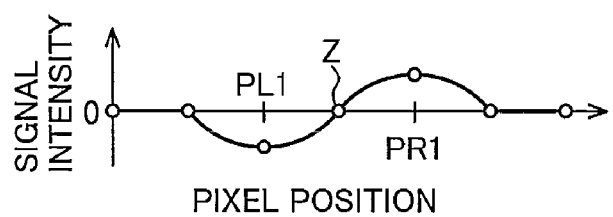
Figure 16D:
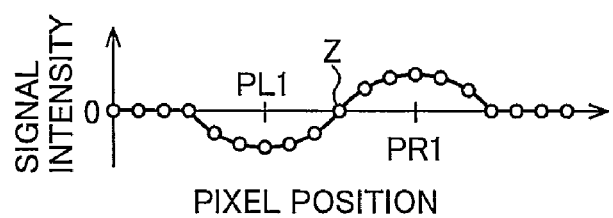
Figure 16E:
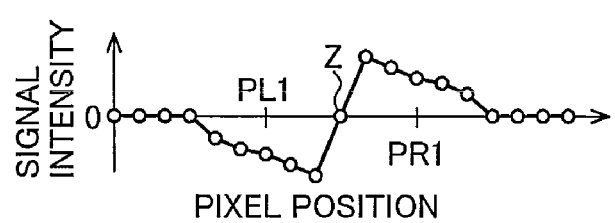
Figure 16F:
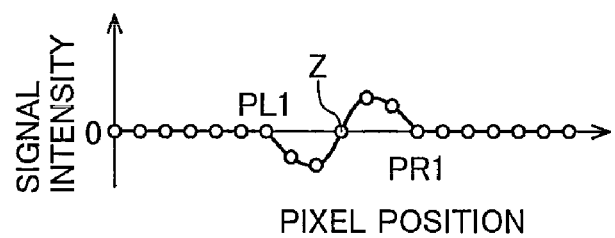

FIGS. 16(a) to 16(f) are drawings schematically illustrating the procedure by which the high-frequency component image generating means 1, image enlarging means 2B, nonlinear processing means 31, and high-frequency component passing means 32B generate high-frequency components: FIG. 16(a) represents an image (step image) with a step variation in brightness, saturation, or another component value; FIG. 16(b) represents the input image Din corresponding to this step image; FIG. 16(c) represents high-frequency component image D1; FIG. 16(d) represents enlarged image D2B; FIG. 16(e) represents nonlinearly processed image D31; FIG. 16(f) represents intermediate image D32B. For simplicity, each is shown as a one-dimensional signal.

As shown in FIG. 16(d), the positions PL1, PR1 of pixels indicating the local maximum and minimum values near the zero crossing point Z in enlarged image D2B also coincide substantially with the positions of the boundaries in enlarged image D2B. In general, with the enlarging method used in the descriptions of the first and second embodiments (an enlarging method in which low-pass filtering is performed on a zero insertion image), the positions of PL1 and PR1 remain unchanged while the number of pixels between the positions indicated by PL1 and PR1 and the zero crossing point Z increases. The number of pixels between the positions indicated by PL1 and PR1 and the zero crossing point Z increases when the enlargement factor for generating enlarged image D2B is increased (or when the sampling interval is shortened).

In the signal representing the high-frequency component of an image obtained by sampling the step edge signal with a shorter sampling interval, the positions of pixels indicating the local maximum and minimum values near the zero crossing point Z move closer to the zero crossing point Z and the amplitude of the signal representing the high-frequency component increases at the positions of pixels closer to the zero crossing point Z.

Therefore, when nonlinearly processed image D31 is generated by amplifying only the signals before and after the zero crossing point Z, it is desirable to perform processing so that the pixel amplitude increases as the pixels move closer to the zero crossing point Z from PL1 and PR1; for example, a nonlinearly processed image D31 in which the pixel amplitude increases as the pixels approach the zero crossing point Z, as shown in FIG. 16(e), can be generated by amplifying the pixel values of pixels closer to the zero crossing point Z than PL1 and PR1 in enlarged image D2B with amplification factors that increase as the pixels approach the zero crossing point Z, and amplifying the pixel values of pixels farther than PL1 or PR1 from the zero crossing point Z with an amplification factor of 1. The invention is not limited to this scheme, however; the amplification factor may have a fixed value greater than 1 for pixels in a given area including the zero crossing point.

An intermediate image D23B corresponding to sampling interval S1 can then be generated by using a high-pass filter to extract only the high-frequency component of the enlarged image D2B generated in this way, as shown in FIG. 16(f).

The above can be summarized as follows: the amplification factors may be set to any values larger than 1 for the pixels in a given region including the zero crossing point Z and may be set to 1 for pixels other than these; the number of pixels between the positions PL1 and PR1 and the zero crossing point Z differs responsive to the enlargement factor used when enlarged image D2B was generated, so when the nonlinearly processed image D31 is generated from enlarged image D2B, the number of pixels (the number of pixels in the given region) for which the amplification factor is set to a value greater than 1 before and after the zero crossing point Z and/or the amplification factor may be varied responsive to the enlargement factor of the image. The amplification factors for these pixels may also be varied depending on their distances from the zero crossing point Z. For example, the amplification factor may be increased as a pixel approaches the zero crossing point Z. The horizontal nonlinear processing means 31h and vertical nonlinear processing means 31v may use different amplification factors and given regions of different sizes.

Second Embodiment

In the first embodiment, the invention was described as being implemented in hardware, but it is also possible to implement some or all of the structures shown in FIG. 1 as software. The processing in this case will be described with reference to FIG. 17 and FIGS. 18 to 23.

Figure 17:
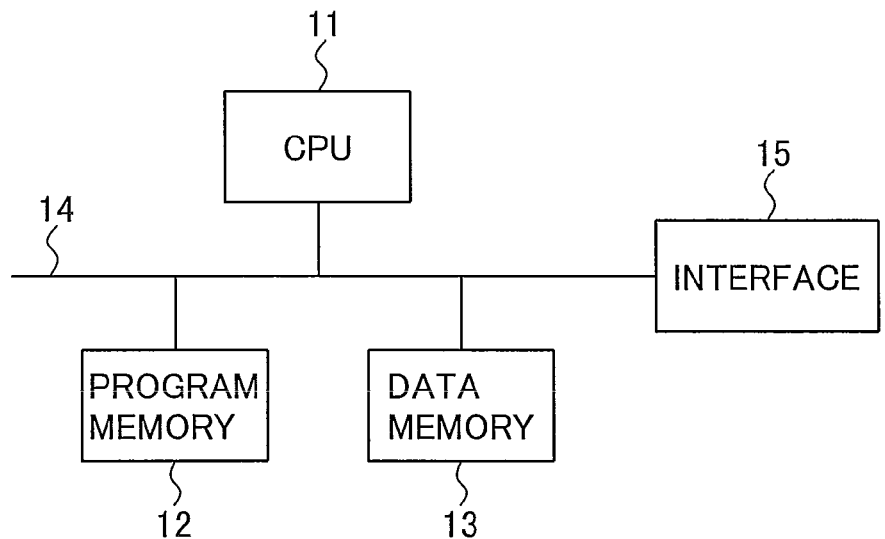
FIG. 17 is a block diagram of an image processing apparatus in a second embodiment of the invention.

FIG. 17 illustrates the image processing apparatus in the second embodiment. The illustrated image processing apparatus has a CPU 11, a program memory 12, a data memory 13, an interface 15, and a bus 14 that interconnects these elements, and can be used as, for example, the image processing unit U1 in the image processing apparatus shown in FIG. 24.

The CPU 11 operates according to a program stored in the program memory 12. During the course of operation, it stores various data in the data memory 13. The enlarged image Dout generated as the result of the processing is supplied through the interface 15 to the display unit 9 in the image display apparatus shown in FIG. 24, and is displayed by the display unit 9.

The processing performed by the CPU 11 will be described below with reference to FIGS. 18 to 23.

Figure 18:
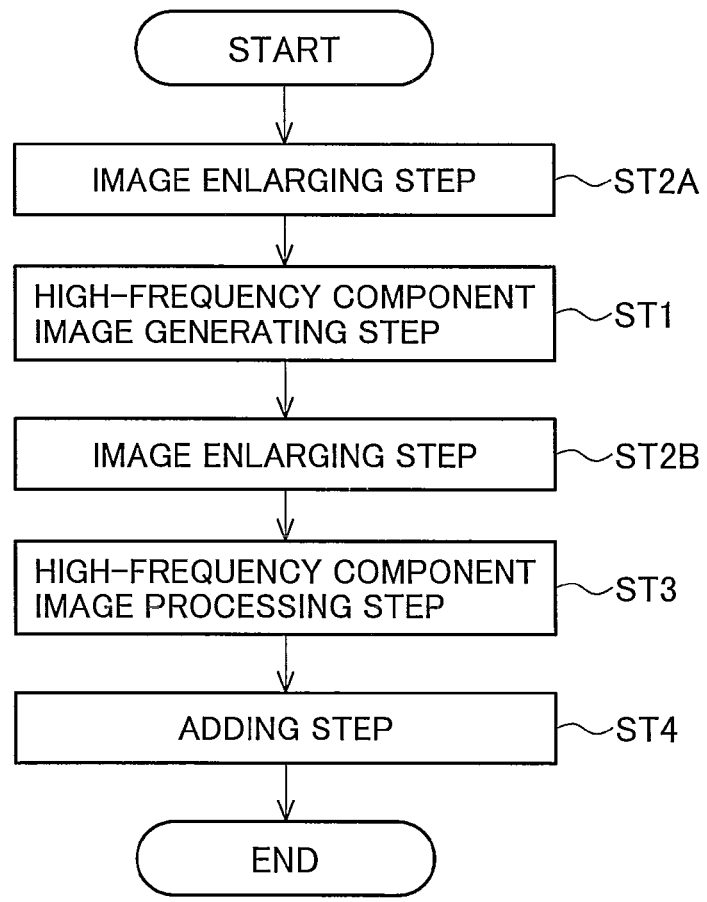
FIG. 18 is a flowchart of an image processing method according to the invention.

FIG. 18 is a drawing showing the flow of an image processing method practiced in the image processing apparatus in FIG. 17; the image processing method shown in FIG. 18 comprises an image enlarging step ST2A, a high-frequency component image generating step ST1, an image enlarging step ST2B, a high-frequency component image processing step ST3, and an adding step ST4.

In the image enlarging step ST2A, enlarged image D2A is generated by enlarging the input image Din input in an image input step (not shown) by the same processing as performed by the image enlarging means 2A in FIGS. 1, 2, and 3.

Figure 19:
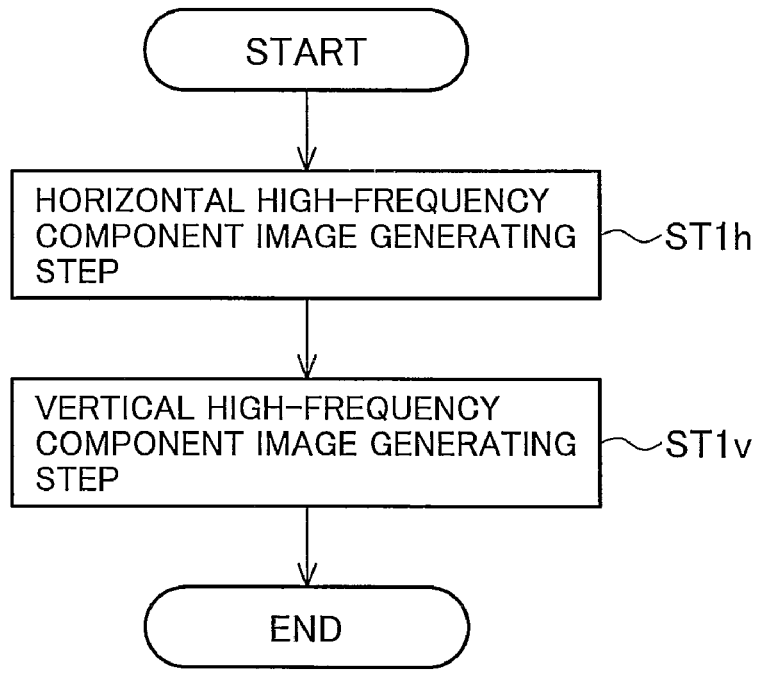
FIG. 19 is a flowchart of the high-frequency component image generating step ST1.

As shown in FIG. 19, the high-frequency component image generating step ST1 comprises a horizontal high-frequency component image generating step ST1h and a vertical high-frequency component image generating step ST1v. In the horizontal high-frequency component image generating step ST1h, the horizontal high-frequency component image D1h is generated by carrying out the same processing as performed by the horizontal high-frequency component image generating means 1h in FIG. 3 on the input image Din. In the vertical high-frequency component image generating step ST1v, the vertical high-frequency component image D1v is generated by carrying out the same processing as performed by the vertical high-frequency component image generating means 1v in FIG. 3 on the input image Din.

Figure 20:
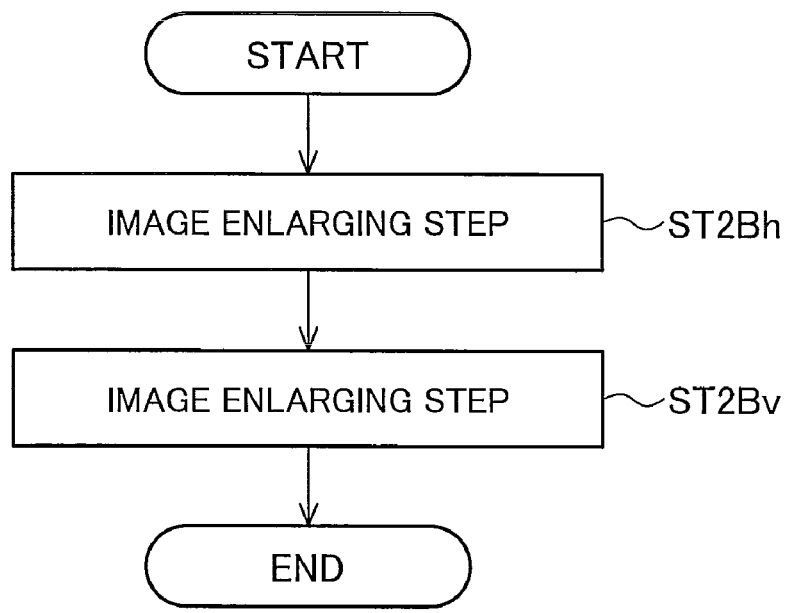
FIG. 20 is a flowchart of image enlarging step ST2B.

As shown in FIG. 20, the image enlarging step ST2B comprises an image enlarging step ST2Bh and an image enlarging step ST2Bv.

In the image enlarging step ST2Bh, enlarged image D2Bh is generated by carrying out the same processing as performed by image enlarging means 2Bh in FIG. 3 on the horizontal high-frequency component image D1h generated in the horizontal high-frequency component image generating step ST1h.

In the image enlarging step ST2Bv, enlarged image D2Bh is generated by carrying out the same processing as performed by image enlarging means 2Bh in FIG. 3 on the vertical high-frequency component image D1v generated in the vertical high-frequency component image generating step ST1v.

Figure 21:
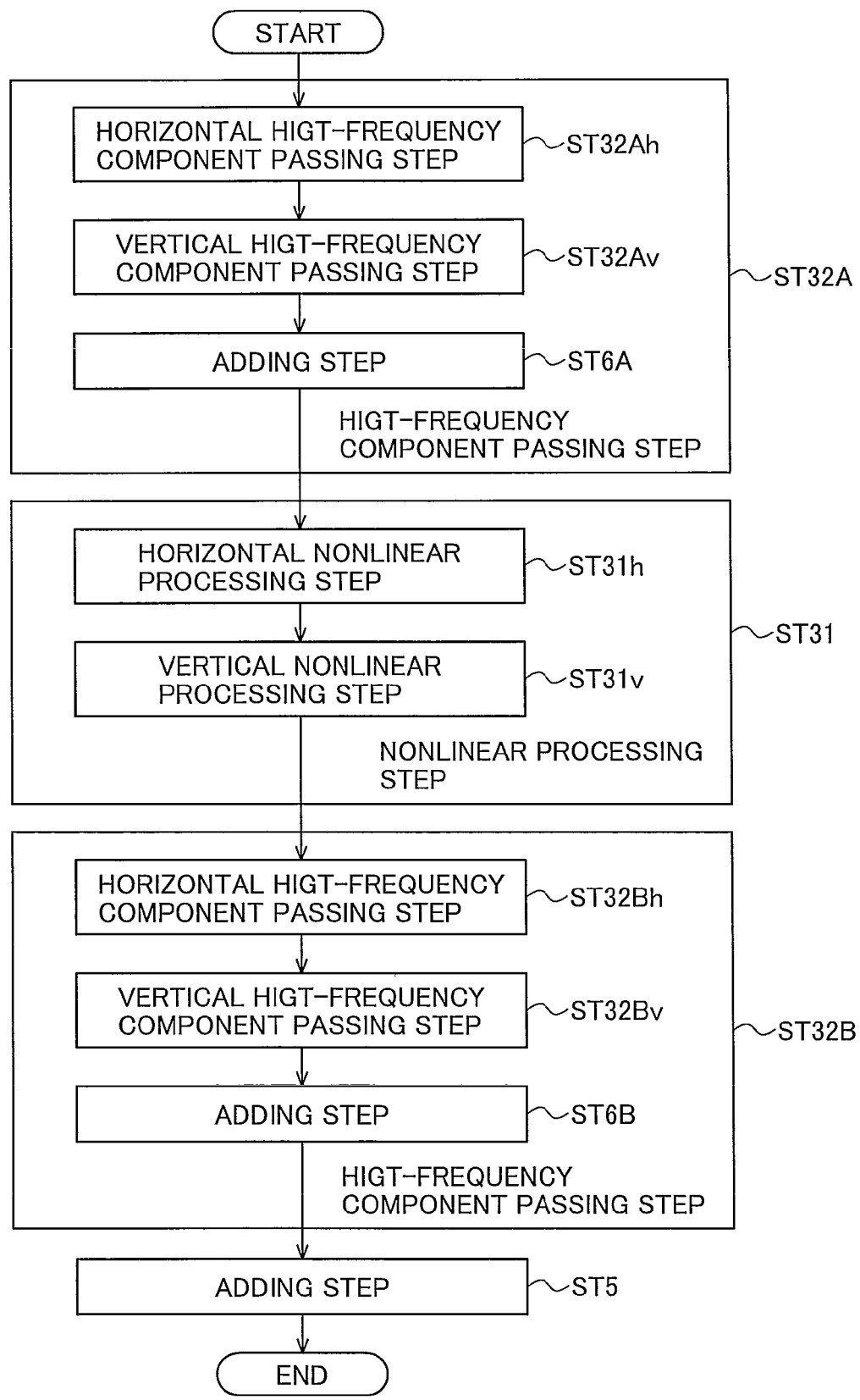
FIG. 21 is a flowchart of the high-frequency component image processing step ST3.

As shown in FIG. 21, the high-frequency component image processing step ST3 comprises a high-frequency component passing step ST32A, a nonlinear processing step ST31, a high-frequency component passing step ST32B, and an adding step ST5.

The high-frequency component passing step ST32A comprises a horizontal high-frequency component passing step ST32Ah, a vertical high-frequency component passing step ST32Av, and an adding step ST6A.

The nonlinear processing step ST31 comprises a horizontal nonlinear processing step ST31h and a vertical nonlinear processing step ST31v.

The high-frequency component passing step ST32B comprises a horizontal high-frequency component passing step ST32Bh, a vertical high-frequency component passing step ST32Bv, and an adding step ST6B.

In the horizontal high-frequency component passing step ST32Ah, an intermediate image D32Ah is generated by carrying out the same processing as performed in horizontal high-frequency component passing means 32Ah in FIG. 3 on the enlarged image D2Bh generated in the image enlarging step ST2Bh. In the vertical high-frequency component passing step ST32Av, an intermediate image D32Av is generated by carrying out the same processing as performed in vertical high-frequency component passing means 32Av in FIG. 3 on the enlarged image D2Bv generated in the image enlarging step ST2Bv. In the adding step ST6A, intermediate image D32A is generated by adding intermediate image D32Ah generated in the horizontal high-frequency component passing step ST32Ah and intermediate image D32Av generated in the vertical frequency component passing step ST32Av.

The same operations as performed by high-frequency component passing means 32A in FIGS. 2 and 3 are thereby performed in the high-frequency component passing step ST232A.

Figure 22:
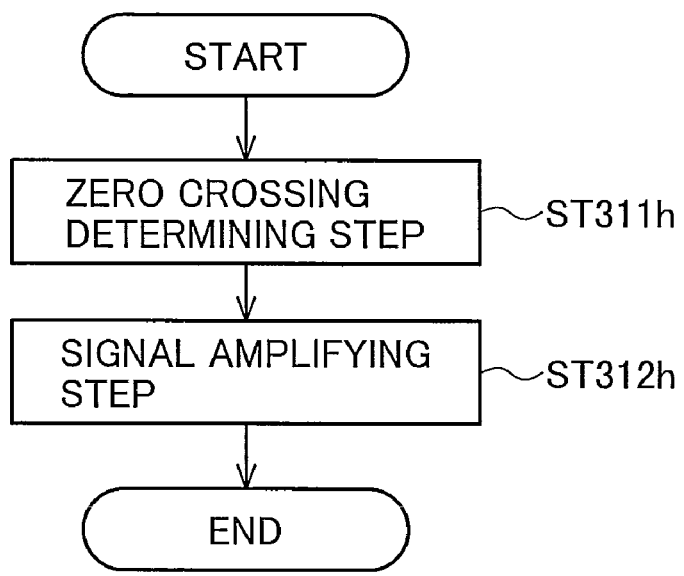
FIG. 22 is a flowchart of the horizontal nonlinear processing step ST31h.

The horizontal nonlinear processing step ST31h, as shown in FIG. 22, comprises a zero crossing determination step ST311h and a signal amplification step ST312h.

The operation in the horizontal nonlinear processing step ST31h is as described below.

First, in the zero crossing determination step ST311h, variations in pixel values of the enlarged image D2Bh generated in the image enlarging step ST2Bh are checked in the horizontal direction. Then points where the pixel values change from positive to negative or vice versa are taken as zero crossing points, and pixels to the left and right of the zero crossing points are identified. In the signal amplification step ST312h, the pixel values of the pixels to the left and right of the zero crossing point in enlarged image D2Bh identified in the zero crossing determination step ST311h are amplified, and the resultant image is generated as nonlinearly processed image D31h.

Figure 23:
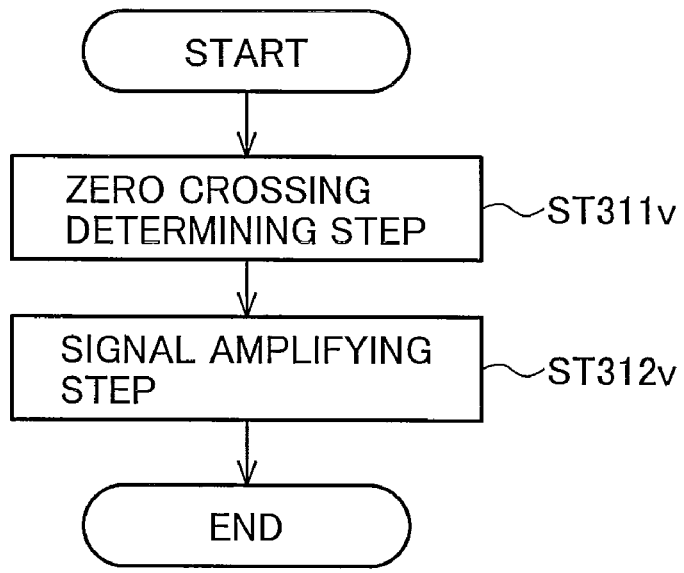
FIG. 23 is a flowchart of the vertical nonlinear processing step ST31v.

The vertical nonlinear processing step ST31v, as shown in FIG. 23, comprises a zero crossing determination step ST311v and a signal amplification step ST312v.

The operation in the vertical nonlinear processing step ST31v is as described below.

First, in the zero crossing determination step ST311v, variations in pixel values of the enlarged image D2Bv generated in the image enlarging step ST2Bv are checked in the vertical direction. Points where the pixel values change from positive to negative or vice versa are taken as zero crossing points and pixels just above and below the zero crossing points are identified. In the signal amplification step ST312h, the pixel values of the pixels just above and below the zero crossing points in the enlarged image D2Bv identified in the zero crossing determination step ST311v are amplified, and the resultant image is generated as nonlinearly processed image D31v.

The same operations as performed by the nonlinear processing means 31 in FIGS. 2 and 3 are thereby performed in the nonlinear processing step ST31.

In the horizontal high-frequency component passing step ST32Bh, a high-pass filtering operation is performed on the nonlinearly processed image D31h generated in the horizontal nonlinear processing step ST31h to generate intermediate image D32Bh. In the vertical high-frequency component passing step ST32Bv, a high-pass filtering operation is performed on the nonlinearly processed image D31v generated in the vertical nonlinear processing step ST31v to generate intermediate image D32Bv. The adding step ST6B generates intermediate image D32B by adding intermediate image D32Bh and intermediate image D32Bv. That is, the same operations as performed by high-frequency component passing means 32B in FIGS. 2 and 3 in the high-frequency component passing step ST32B are performed.

In the adding step ST5, the intermediate image D32A generated in the high-frequency component passing step ST32A and the intermediate image D32B generated in the high-frequency component passing step ST32B are added to obtain high-frequency component image D3.

The same operations as performed by the high-frequency component image processing means 3 in FIGS. 1, 2, and 3 are thereby performed in the high-frequency component image processing step ST3.

In the adding step ST4, the enlarged image D2A generated in the image enlarging step ST2A and the high-frequency component image D3 generated in the high-frequency component image processing step ST3 are added to generate an image Dout. The generated image Dout is then output as the final enlarged image in a step that is not shown.

In the second embodiment described above, an image can be enlarged by the same processing as in the image processing apparatus described in the first embodiment, so the same effect is obtained as from the image processing apparatus described in the first embodiment.

Like the image processing apparatus described in the first embodiment, the image processing apparatus in the second embodiment can be incorporated into an image display apparatus, and an image display apparatus for displaying the image Dout generated by the image processing apparatus according to the second embodiment can also produce the same effect as obtained from the image processing apparatus described in the first embodiment. In addition, the image processing methods carried out by using the image processing apparatus in the first and second embodiments and image display methods using these methods can also produce the same effect.

The variations described in the first embodiment are also applicable to the image processing apparatus and method according to the second embodiment.

The structure of an image display apparatus using the image processing apparatus described in the first or second embodiment is not limited to the structure shown in FIG. 24.

What is claimed is:

1. An image processing apparatus for enlarging an input image, comprising:
 a first image enlarging unit configured to enlarge the input image and outputting a first enlarged image;
 a high-frequency component image generating unit configured to extract a high-frequency component of the input image and generating a first high-frequency component image;
 a second image enlarging unit configured to enlarge the first high-frequency component image and outputting a second enlarged image; and
 a high-frequency component image processing unit configured to extract a high-frequency component of the second enlarged image and generating a second high-frequency component image; wherein the high-frequency component image processing unit determines a point where pixel values of pixels in the second enlarged image change from a positive value to a negative value, or from a negative value to a positive value as a zero crossing point, and amplifies the pixel values with an amplification factor, the amplification factor used for amplifying the pixel values of pixels in an area including the zero crossing point being larger than the amplification factor used for amplifying the pixel values of other pixels.

2. The image processing apparatus of claim 1, wherein the high-frequency component image processing unit comprises:
 a first high-frequency component passing unit configured to extract only the high-frequency component of the second enlarged image;
 a nonlinear processing unit configured to process pixel values in the second enlarged image by a nonlinear process that determines said point and amplifies the pixel values with the amplification factor; and
 a second high-frequency component passing unit configured to extract only a high-frequency component of an image output by the nonlinear processing unit,
 wherein the output of the first high-frequency component passing unit and the output of the second high-frequency component passing unit are added and output as the second high-frequency component image.

3. The image processing apparatus of claim 2, wherein:
 the high-frequency component image generating unit has a horizontal high-frequency component image generating unit configured to generate a horizontal high-frequency component image by using, for each pixel in the input image, pixel values of horizontally neighboring pixels;
 the second image enlarging unit has
 a third image enlarging unit configured to enlarge the horizontal high-frequency component image and outputting a third enlarged image;
 the first high-frequency component passing unit has
 a first horizontal high-frequency component passing unit configured to extract only a high-frequency component of the third enlarged image;
 the nonlinear processing unit has
 a horizontal nonlinear processing unit configured to process pixel values in the third enlarged image by a nonlinear process that amplifies with a comparatively large amplification factor in edge portions including stepped signal variations of horizontally aligned pixels and outputting a horizontal nonlinear processed image; and
 the second high-frequency component passing unit has
 a second horizontal high-frequency component passing unit configured to extract only a high-frequency component of the horizontal nonlinear processed image.

4. The image processing apparatus of claim 2, wherein:
 the high-frequency component image generating unit has a vertical high-frequency component image generating unit configured to generate a vertical high-frequency component image by using, for each pixel in the input image, pixel values of vertically neighboring pixels;
 the second image enlarging unit has
 a fourth image enlarging unit configured to enlarge the vertical high-frequency component image and outputting a fourth enlarged image;
 the first high-frequency component passing unit has
 a first vertical high-frequency component passing unit configured to extract only a high-frequency component of the fourth enlarged image;
 the nonlinear processing unit has
 a vertical nonlinear processing unit configured to process pixel values in the fourth enlarged image by a nonlinear process that amplifies with a comparatively large amplification factor in edge portions including stepped signal variations of vertically aligned pixels and outputting a vertical nonlinear processed image; and
 the second high-frequency component passing unit has
 a second vertical high-frequency component passing unit configured to extract only a high-frequency component of the vertical nonlinear processed image.

5. The image processing apparatus of claim 2, wherein:
 the high-frequency component image generating unit has:
 a horizontal high-frequency component image generating unit configured to generate a horizontal high-frequency component image by using, for each pixel in the input image, pixel values of horizontally neighboring pixels and a vertical high-frequency component image generating unit configured to generate a vertical high-frequency component image by using, for each pixel in the input image, pixel values of vertically neighboring pixels;
 the second image enlarging unit has
 a third image enlarging unit configured to enlarge the horizontal high-frequency component image and outputting a third enlarged image, and
 a fourth image enlarging unit configured to enlarge the vertical high-frequency component image and outputting a fourth enlarged image;
 the first high-frequency component passing unit has
 a first horizontal high-frequency component passing unit configured to extract only the high-frequency component of the third enlarged image, and
 a first vertical high-frequency component passing unit configured to extract only a high-frequency component of the fourth enlarged image,
 the nonlinear processing unit has
 a horizontal nonlinear processing unit configured to process pixel values in the third enlarged image by a nonlinear process that amplifies with a comparatively large amplification factor in edge portions including stepped signal variations of horizontally aligned pixels and outputting a horizontal nonlinear processed image and a vertical nonlinear processing unit configured to process pixel values in the fourth enlarged image by a nonlinear process that amplifies with a comparatively large amplification factor in edge portions including stepped signal variations of vertically aligned pixels and outputting a vertical nonlinear processed image, and the second high-frequency component passing unit has a second horizontal high-frequency component passing unit configured to extract only a high-frequency component of the horizontal nonlinear processed image and a second vertical high-frequency component passing unit configured to extract only a high-frequency component of the vertical nonlinear processed image.

6. The image processing apparatus of claim 3, wherein the horizontal nonlinear processing unit has a first zero crossing determining unit configured to determine a point where the pixel values of pixels in the third enlarged image change from a positive value to a negative value or from a negative value to a positive value as a zero crossing point and a first signal amplifying unit configured to amplify pixel values of the third enlarged image with an amplification factor determined according to a determination result of the first zero crossing determining unit.

7. The image processing apparatus of claim 6, wherein the first signal amplifying unit amplifies the pixel values of pixels in a first area including the zero crossing point determined by the first zero crossing determining unit with an amplification factor greater than one (1) and amplifies the pixel values of the other pixels with an amplification factor of 1.

8. The image processing apparatus of claim 7, wherein the first area varies according to an enlarging factor in the second image enlarging unit.

9. The image processing apparatus of claim 7, wherein the amplification factor for pixels in the first area varies for each pixel.

10. The image processing apparatus of claim 1, wherein the first image enlarging unit has a zero inserting unit configured to output an image with pixels of pixel value 0 inserted at least either in the horizontal direction or vertical direction of the input image, and a low-frequency component passing unit configured to extract a low-frequency component of the image output from the zero inserting unit and outputting the first enlarged image.

11. The image processing apparatus of claim 3, wherein the third image enlarging unit has a zero inserting unit configured to output an image with pixels of pixel value 0 inserted at least either in the horizontal or vertical direction of the horizontal high-frequency component image, and a low-frequency component passing unit configured to extract a low-frequency component of the image output from the zero inserting unit and outputting the third enlarged image.

12. The image processing apparatus of claim 4, wherein the fourth image enlarging unit has a zero inserting unit configured to output an image with pixels of pixel value 0 inserted at least either in the horizontal or vertical direction of the vertical high-frequency component image, and a low-frequency component passing unit configured to extract the low-frequency component of the image output from the zero inserting unit and outputting the fourth enlarged image.

13. The image processing apparatus of claim 3, wherein the second horizontal high-frequency component passing unit, as the process of extracting only the high-frequency component, determines a difference between the pixel value of each pixel in the horizontal nonlinear processed image and a simple average value or weighted average value of the pixel values of horizontally neighboring pixels.

14. An image display apparatus comprising the image processing apparatus of claim 1.

15. An image processing method for enlarging an input image, comprising:

a first image enlarging step of enlarging the input image and outputting a first enlarged image;

a high-frequency component image generating step of extracting a high-frequency component of the input image and generating a first high-frequency component image;

a second image enlarging step of enlarging the first high-frequency component image and outputting a second enlarged image; and a high-frequency component image processing step of extracting a high-frequency component of the second enlarged image and generating a second high-frequency component image; wherein said high-frequency component image processing step determines a point where pixel values of pixels in the second enlarged image change from a positive value to native value, or from a negative value to a positive value as a zero crossing point, and amplifies the pixel values with an amplification factor, the amplification factor used for amplifying the pixel values of pixels in an area including the zero crossing point being larger than the amplification factor used for amplifying the pixel values of other pixels.

16. An image display method comprising the image processing method of claim 15.

17. The image processing apparatus of claim 4, wherein the vertical nonlinear processing unit has a second zero crossing determining unit configured to determine a point where the pixel values of pixels in the fourth enlarged image change from a positive value to a negative value or from a negative value to a positive value as a zero crossing point and a second signal amplifying unit configured to amplify pixel values of the fourth enlarged image with an amplification factor determined according to a determination result of the second zero crossing determining unit.

18. The image processing apparatus of claim 17, wherein the second signal amplifying unit amplifies the pixel values of pixels in a second area including the zero crossing point determined by the second zero crossing determining unit with an amplification factor greater than one (1) and amplifies the pixel values of the other pixels with an amplification factor of 1.

19. The image processing apparatus of claim 18, wherein the second area varies according to an enlarging factor in the second image enlarging unit.

20. The image processing apparatus of claim 18, wherein the amplification factor for pixels in the second area varies for each pixel.

21. The image processing apparatus of claim 4, wherein the second vertical high-frequency component passing unit, as the process of extracting only the high-frequency component, determines a difference between the pixel value of each pixel in the vertical nonlinear processed image and a simple average value or weighted average value of the pixel values of vertically neighboring pixels.

* * * * *